United States Patent
Stark et al.

(10) Patent No.: US 8,813,776 B2
(45) Date of Patent: Aug. 26, 2014

(54) VALVES, PRESSURE SENSING DEVICES, AND CONTROLLERS FOR HEATING APPLIANCES

(75) Inventors: Mark H. Stark, St. Louis, MO (US); Mike C. Santinanavat, Chesterfield, MO (US); Ryan D. Jensen, St. Louis, MO (US); John F. Broker, Warrenton, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 13/983,814

(22) PCT Filed: Jan. 24, 2012

(86) PCT No.: PCT/US2012/022400
§ 371 (c)(1),
(2), (4) Date: Aug. 6, 2013

(87) PCT Pub. No.: WO2012/115740
PCT Pub. Date: Aug. 30, 2012

(65) Prior Publication Data
US 2013/0312730 A1    Nov. 28, 2013

Related U.S. Application Data

(60) Provisional application No. 61/444,956, filed on Feb. 21, 2011.

(51) Int. Cl.
| | |
|---|---|
| F23N 1/00 | (2006.01) |
| F16K 31/06 | (2006.01) |
| F23K 5/00 | (2006.01) |
| G05D 16/20 | (2006.01) |
| F16K 1/44 | (2006.01) |
| F24H 9/20 | (2006.01) |
| F16K 37/00 | (2006.01) |

(52) U.S. Cl.
CPC ......... F16K 31/0658 (2013.01); *F23N 2025/04* (2013.01); *F23N 2035/24* (2013.01); *F23K 5/007* (2013.01); *G05D 16/2013* (2013.01); *F23N 2035/14* (2013.01); *F16K 1/443* (2013.01); *F23N 1/005* (2013.01); *F24H 9/2085* (2013.01); *F16K 37/0058* (2013.01); *F23N 2035/20* (2013.01)

USPC ............... 137/487.5; 137/557; 137/614.18; 251/129.08

(58) Field of Classification Search
CPC ................................ F23N 1/005; F16K 1/443
USPC .......................... 137/557, 614.18, 613, 487.5; 251/129.08
See application file for complete search history.

(56) References Cited

U.S. PATENT DOCUMENTS

| | | |
|---|---|---|
| 1,822,645 A | 9/1931 | Crane |
| 3,376,533 A | 4/1968 | Chass |

(Continued)

FOREIGN PATENT DOCUMENTS

| | | |
|---|---|---|
| JP | 4-54383 | 2/1992 |
| JP | 9-97717 | 4/1997 |

(Continued)

OTHER PUBLICATIONS

International Search Report and Written Opinion for PCT International Application No. PCT/US2012/022400 (published Aug. 30, 2012 as WO2012/115740) dated Sep. 19, 2012; 13 pgs.; the instant application is a national phase of PCT International Application No. PCT/US2012/022400.

(Continued)

*Primary Examiner* — Eric Keasel
(74) *Attorney, Agent, or Firm* — Harness, Dickey & Pierce, P.L.C.

(57) ABSTRACT

A valve apparatus includes substantially co-aligned first and second valve seats and substantially co-aligned first and second valve members. The first valve member is moveable relative to the first valve seat between at least an open position in which the first valve member is spaced from the first valve seat and a closed position in which the first valve member is seated against the first valve seat. The second valve member is moveable relative to the second valve seat between at least an open position in which the second valve member is spaced from the second valve seat and a closed position in which the second valve member is seated against the second valve seat. An armature is operable for moving the first and second valve members, in response to a magnetic field generated by a coil.

20 Claims, 10 Drawing Sheets

(56) References Cited

U.S. PATENT DOCUMENTS

| | | | |
|---|---|---|---|
| 3,469,590 A * | 9/1969 | Barker | 251/129.08 |
| 3,482,448 A | 12/1969 | Gaffard | |
| 3,921,666 A * | 11/1975 | Leiber | 137/557 |
| 4,129,813 A | 12/1978 | Hunts et al. | |
| 4,168,719 A * | 9/1979 | Renshaw | 137/613 |
| 4,314,585 A * | 2/1982 | Nishimiya et al. | 251/129.08 |
| 4,645,450 A | 2/1987 | West | |
| 4,779,762 A | 10/1988 | Klein et al. | |
| 4,796,661 A * | 1/1989 | Hishinuma et al. | 137/487.5 |
| 4,986,468 A | 1/1991 | Deisinger | |
| 5,197,508 A * | 3/1993 | Gottling et al. | 251/129.08 |
| 5,215,115 A | 6/1993 | Dietiker | |
| 5,303,561 A | 4/1994 | Bahel et al. | |
| 5,329,956 A | 7/1994 | Marriott et al. | |
| 5,632,614 A | 5/1997 | Consadori et al. | |
| 5,722,064 A | 2/1998 | Campana, Jr. | |
| 5,816,560 A * | 10/1998 | Obser | 251/129.08 |
| 5,908,980 A | 6/1999 | Hwang et al. | |
| 5,917,691 A | 6/1999 | Kadah | |
| 6,000,390 A | 12/1999 | Evers et al. | |
| 6,047,718 A * | 4/2000 | Konsky et al. | 137/614.18 |
| 6,093,152 A | 7/2000 | Patterson | |
| 6,283,145 B1 | 9/2001 | Fenn | |
| 6,994,309 B2 | 2/2006 | Fernández-Sein | |
| 7,020,543 B1 | 3/2006 | Jaeschke et al. | |
| 7,076,373 B1 | 7/2006 | Munsterhuis et al. | |
| 7,191,039 B2 | 3/2007 | Jaeschke et al. | |
| 7,278,447 B2 | 10/2007 | Kumar | |
| 7,591,245 B2 | 9/2009 | Baasch et al. | |
| 7,938,382 B2 | 5/2011 | Huerta-Ochoa et al. | |
| 8,275,484 B2 | 9/2012 | Lorenz et al. | |
| 8,381,760 B2 | 2/2013 | Santinanavat et al. | |
| 2002/0044064 A1 | 4/2002 | Mogi | |
| 2009/0189101 A1 | 7/2009 | Takeda et al. | |
| 2009/0260697 A1 | 10/2009 | Mevius et al. | |
| 2012/0214117 A1 | 8/2012 | Broker et al. | |

FOREIGN PATENT DOCUMENTS

| | | |
|---|---|---|
| JP | 2008-151260 | 7/2008 |
| JP | 4423615 | 3/2010 |

OTHER PUBLICATIONS

Japanese Office Action dated Mar. 11, 2014, issued in co-pending Japanese Application No. 2013-554457 which lists the same inventors and also claims priority to the same parent application as the instant application (PCT Patent Application No. PCT/US2012/022400); 5 pgs.

* cited by examiner

FIG. 11

VALVES, PRESSURE SENSING DEVICES, AND CONTROLLERS FOR HEATING APPLIANCES

CROSS-REFERENCE TO RELATED APPLICATIONS

This application is a National Stage of International Application No. PCT/US2012/022400, filed Jan. 24, 2012 which claims the benefit of and priority to U.S. Provisional Application No. 61/444,956 filed Feb. 21, 2011. The entire disclosures of each of the above applications are incorporated herein by reference.

FIELD

The present disclosure relates to valves, pressure sensing devices, controllers, and systems including the same for valve control of fuel to a flame of a heating appliance.

BACKGROUND

This section provides background information related to the present disclosure which is not necessarily prior art.

A gas-fired, warm air furnace that operates at two or more gas flow rates is generally referred to as a variable or multi-stage furnace. Multistage furnaces are frequently selected by homeowners for replacement of existing furnaces because they offer increased performance and comfort. But in multi-stage or variable heating furnaces, the furnace control is only configured for one-way communication with a gas valve. This typically is in the form of a signal applying a voltage source or a variable current signal to the gas valve. Such signals, however, are not capable of providing feedback, and may not be compatible with replacement or retrofit gas valves or other components of the furnace. Accordingly, the inventors hereof have recognized that a need still exists for an improved control of variable stage heating systems.

SUMMARY

This section provides a general summary of the disclosure, and is not a comprehensive disclosure of its full scope or all of its features.

Exemplary embodiments are disclosed of valve apparatus, pressure sensing apparatus, controllers, and systems including the same. In an exemplary embodiment of a valve apparatus, a first valve seat is substantially co-aligned with a second valve seat. A first valve member is substantially aligned with a second valve member. The first valve member is moveable relative to the first valve seat between at least an open position in which the first valve member is spaced from the first valve seat and a closed position in which the first valve member is seated against the first valve seat. The second valve member is moveable relative to the second valve seat between at least an open position in which the second valve member is spaced from the second valve seat and a closed position in which the second valve member is seated against the second valve seat. An armature is operable for moving the first and second valve members relative to at least the second valve seat to vary an opening area therebetween, in response to a magnetic field generated by a coil.

According to another aspect of the present disclosure, exemplary embodiments of pressure sensing apparatus for valves are also provided. In an exemplary embodiment, a pressure sensing apparatus includes a diaphragm moveable in response to changes in pressure acting against the diaphragm, a light emitter, and a light sensing device. A light attenuator is coupled to the diaphragm such that the light attenuator is moveable by the diaphragm between the light emitter and the light sensing device in response to changes in pressure acting against the diaphragm. The light attenuator is configured to attenuate or vary the amount of light transmitted to the light sensing device from the light emitter as the light attenuator is moved therebetween by the diaphragm in response to changes in pressure. The light sensing device is operable to responsively provide a voltage output commensurate with the amount of light sensed by the light sensing device, which voltage output is indicative of a sensed pressure acting against the diaphragm.

In another exemplary embodiment, a pressure sensing apparatus includes a diaphragm moveable in response to changes in pressure acting against the diaphragm, a first light emitter, a second light emitter, a first light sensing device, and a second light sensing device. A light interrupter is coupled to the diaphragm such that the light interrupter is moveable by the diaphragm between the first light emitter and the first light sensing device when the diaphragm is exposed to a first pressure acting against the diaphragm and such that the light interrupter is moveable by the diaphragm between the second light emitter and the second light sensing device when the diaphragm is exposed to a second pressure acting against the diaphragm. A desired pressure of a valve apparatus can be established by interpolating between first and second positions at which the light interrupter is detected by the first and second light sensing devices corresponding to the first and second pressures.

In another exemplary embodiment, a pressure sensing apparatus includes a diaphragm moveable in response to changes in pressure acting against the diaphragm, a first switch, a second switch, and a trigger coupled to the diaphragm such that the trigger is moveable by the diaphragm to actuate the first switch when the diaphragm is exposed to a first pressure acting against the diaphragm, and such that the trigger is moveable by the diaphragm to actuate the second switch when the diaphragm is exposed to a second pressure acting against the diaphragm. The first switch and the second switch device are operable to responsively provide an output that is indicative of sensed pressure at the first pressure and second pressure, respectively.

In another exemplary embodiment, a pressure sensing apparatus includes a transformer and a diaphragm moveable in response to changes in pressure acting against the diaphragm. The transformer includes a moveable core. The moveable core is coupled to the diaphragm such that the moveable core is movable by the diaphragm to vary output of the transformer with changes in pressure acting against the diaphragm. The transformer is operable for providing an output that varies with core movement, which is commensurate with changes in outlet pressure.

According to another aspect of the present disclosure, exemplary embodiments of controllers or control systems for controlling operation of valves are provided. In an exemplary embodiment, a system includes a controller in communication with a pressure sensor that provides an output indicative of a pressure within a pressurized volume in a valve. The controller is configured to control application of input voltage to a coil that varies an opening area between a valve and a valve seat based on a magnetic field generated by the coil, the magnitude of which is dependent on the input voltage that is applied to the coil. The controller is configured to determine a sensed pressure from the output of the pressure sensor, and to responsively adjust the application of input voltage to the coil based on the sensed pressure, to thereby adjust the opening area between the valve and the valve seat to achieve a desired pressure at an outlet of the valve.

In another exemplary embodiment, a system includes a solenoid coil, a pressure sensor, and a controller. The solenoid coil is configured to generate a magnetic field in response to an input voltage to the solenoid coil and to displace a valve member to vary an opening area between the valve member and a valve seat to adjust pressure at an outlet based on a magnitude of the magnetic field, wherein the magnitude of the magnetic field is dependent on the input voltage that is applied to the solenoid coil. The pressure sensor is in communication with the outlet and configured to provide an output indicative of pressure at the outlet. The controller is in communication with the pressure sensor. The controller is configured to determine a sensed outlet pressure from the output of the pressure sensor, and to responsively control the application of input voltage to the solenoid coil based on the output of the pressure sensor indicative of pressure at the outlet, to thereby adjust the opening area between the valve member and the valve seat to achieve a desired pressure at the outlet.

Further areas of applicability will become apparent from the description provided herein. The description and specific examples in this summary are intended for purposes of illustration only and are not intended to limit the scope of the disclosure.

DRAWINGS

The drawings described herein are for illustrative purposes only of selected embodiments and not all possible implementations, and are not intended to limit the scope of the present disclosure.

FIG. 11 shows a chart illustrating various exemplary embodiments of a pressure sensor apparatus in combination with different valve apparatus, and controllers.

Corresponding reference numerals indicate corresponding parts throughout the several views of the drawings.

DETAILED DESCRIPTION

Figure 1:
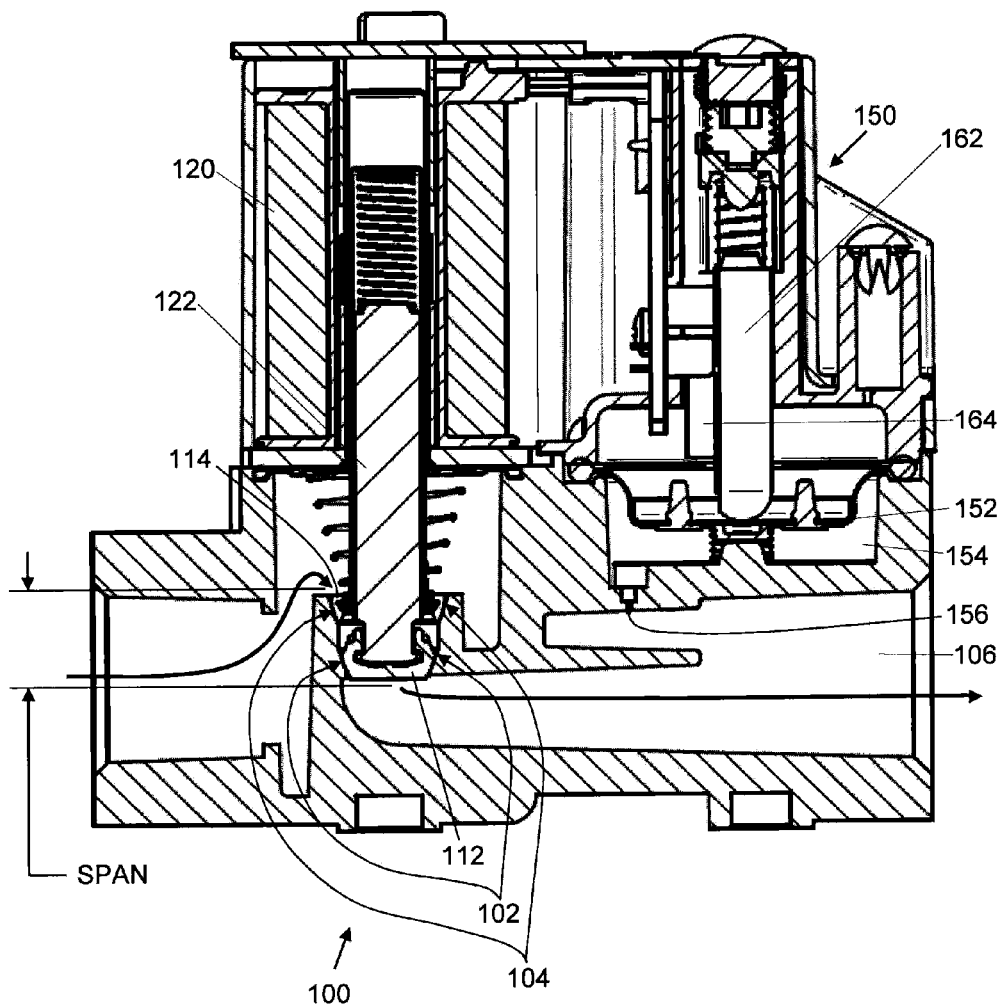
FIG. 1 is a cross-sectional view of an exemplary embodiment of a valve apparatus for adjusting gas flow rate to a variable output heating apparatus.
Figure 2:
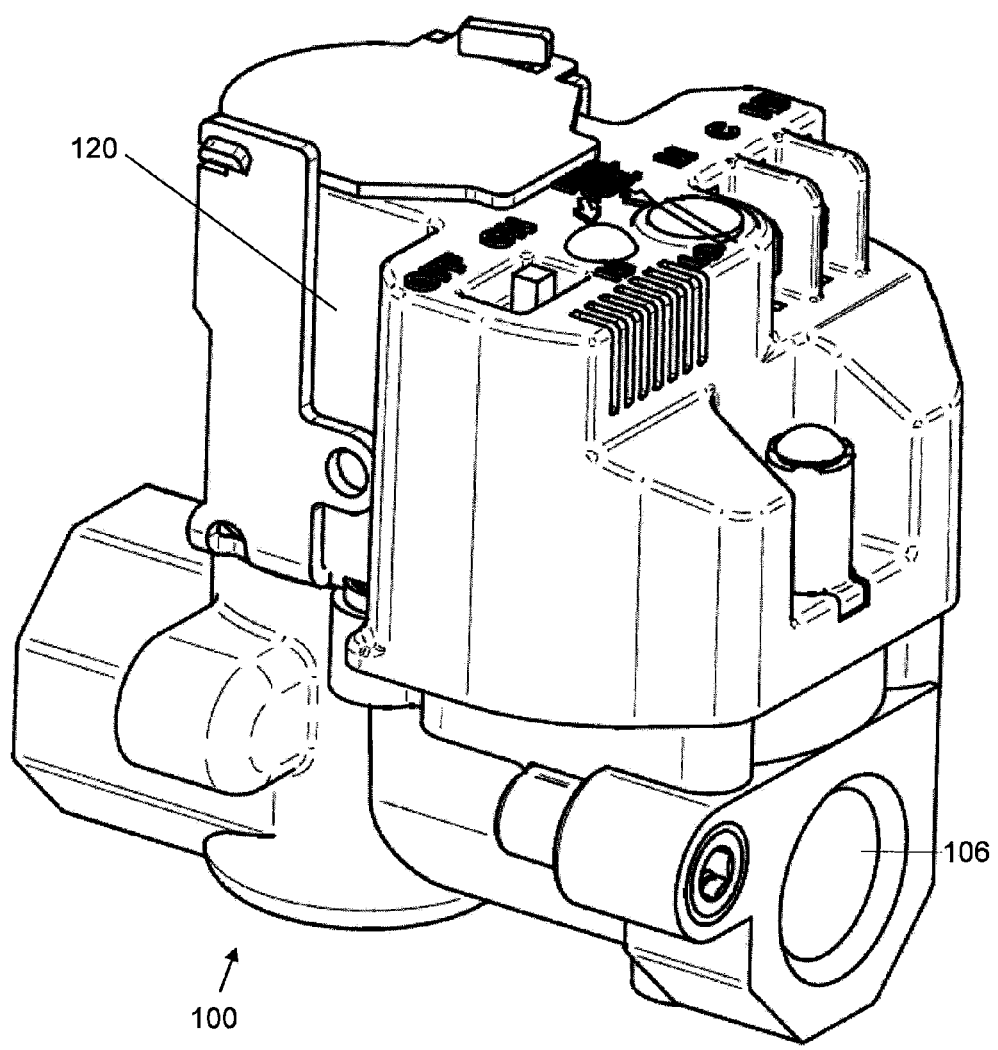
FIG. 2 is a perspective view of the valve apparatus shown in FIG. 1 according to the principles of the present disclosure.

Example embodiments will now be described more fully with reference to the accompanying drawings.

According to one aspect of the present disclosure, various exemplary embodiments of a pressure sensing apparatus are provided, which may be used in combination with a valve apparatus having a valve member that moves relative to a seat to vary an opening therebetween for controlling an outlet pressure. Exemplary embodiments of a pressure sensing apparatus may also be used in combination with a controller that varies an input voltage to a coil for adjusting the opening area between the valve member and seat, based on an outlet pressure sensed by the pressure sensing apparatus.

According to another aspect of the present disclosure, exemplary embodiments of valve apparatus are also provided, which may be used in combination with the various embodiments of pressure sensor apparatus. In an exemplary embodiment, a valve apparatus may include a first valve seat and a second valve seat substantially co-aligned (e.g., generally coaxial) with the first valve seat. A first valve member is substantially aligned (e.g., generally coaxial) with a second valve member. The first valve member is moveable relative to the first valve seat between at least an open position in which the first valve member is spaced from the first valve seat and a closed position in which the first valve member is seated against the first valve seat. The second valve member is moveable relative to the second valve seat between at least an open position in which the second valve member is spaced from the second valve seat and a closed position in which the second valve member is seated against the second valve seat. An armature is operable for moving the first and second valve members relative to at least the second valve seat to vary an opening area therebetween, in response to a magnetic field generated by a coil. The valve apparatus may be a modulating valve apparatus configured so as to be operable to vary the outlet pressure to thereby vary the heating output of a variable capacity heating apparatus.

According to another aspect of the present disclosure, exemplary embodiments of pressure sensing apparatus for valves are also provided. In an exemplary embodiment of a pressure sensing apparatus, an output voltage is provided that is indicative of a pressure acting against a diaphragm. The diaphragm is in fluid communication with the valve. The diaphragm is moveable in response to changes in pressure. The pressure sensing apparatus also includes a light emitter, a light sensing device, and a light attenuator. The light attenuator moves between the light emitter and light sensing device. The light attenuator is operated by movement of the diaphragm in response to changes in pressure acting against the diaphragm. The light attenuator attenuates the amount of light that is transmitted to the light sensing device as the light attenuator is operated by the diaphragm in response to changes in pressure.

According to another aspect of the present disclosure, exemplary embodiments of controllers or control systems for controlling operation of valves are provided. In an exemplary embodiment, a controller or processor is in communication with a pressure sensor that provides an output indicative of a pressure within a pressurized volume in a valve. The application of input voltage to a coil is controlled to vary an opening area between a valve and a valve seat based on a magnetic field generated by the coil, the magnitude of which is dependent on the input voltage that is applied to the coil. The controller or processor is configured to determine a sensed pressure from the output of the pressure sensor and to responsively adjust the application of input voltage to the coil based on the sensed pressure, to thereby adjust the opening area between the valve and the valve seat to achieve a desired pressure at the outlet of the valve.

With reference now to the figures, FIG. 1 illustrates a first exemplary embodiment of a valve apparatus 100 that is operable for controlling gas flow to control the output of a heating apparatus. In this example, the valve apparatus 100 may be a single stage valve that provides a single outlet operating capacity, a two-stage valve that provides for at least two distinct operating capacities, or a modulating valve that provides for variable capacity operation.

The valve apparatus 100 includes a first valve seat 102, a second valve seat 104, and an outlet 106. The second valve seat 104 substantially co-aligned with the first valve seat 102.

The valve apparatus 100 also includes a first valve member 112, which is moveable relative to the first valve seat 102. The first valve member 112 is spaced from the first valve seat 102 when the first valve member 112 is in an open position. The first valve member 112 is seated against the first valve seat 102 when the first valve member 112 is in a closed position.

The valve apparatus 100 further includes a second valve member 114 substantially co-aligned (e.g., coaxial) with the first valve member 112. The second valve member 114 is moveable relative to the second valve seat 104. The second valve member 114 is spaced from the second valve seat 104 when the second valve member 114 is in an open position. The second valve member 114 is seated against the second valve seat 104 when the second valve member 114 is in a closed position.

With continued reference to FIG. 1, the valve apparatus 100 also includes a coil 120 and an armature 122. The armature 122 is configured to operatively move the first and second valve member 112, 114 in response to a magnetic field generated by the coil 120. The armature 122 is configured to move the first and second valve members 112, 114 relative to the second valve seat 104 to vary an opening area therebetween. The armature 122 is configured to move a first distance to move the first valve member 112 away from a closed position against the first valve seat 102 towards an open position. The armature 122 is also configured to move beyond the first distance so as to also then move the second valve member 114 away from a closed position against the second valve seat 104 and towards an open position.

Unlike some conventional gas valves, the flow of gas through the valve apparatus 100 is not diverted to a regulating diaphragm for moving a valve member to control flow. In this exemplary embodiment, the valve apparatus 100 does not include any regulator diaphragm having a direct mechanical linkage to a valve member (e.g., the first or second valve members 112, 114) for mechanically imparting movement of the valve member relative to a seat (e.g., the first or second valve seats 102, 104). Instead of controlling flow via a regulator diaphragm that is responsive to diverted gas flow, the entire flow of gas through the valve apparatus 100 is directly controlled via the first and second valve members 112, 114 and first and second valve seats 102, 104. Thus, this exemplary embodiment of a valve 100 is a direct-acting valve that directly controls the rate of flow via the first and second valve members 112, 114, as opposed to indirect-acting valves that control flow via a regulator diaphragm that imparts movement to a valve poppet.

Furthermore, unlike some conventional gas valves having side-by-side valve members, the first valve member 112 and second valve member 114 are substantially co-aligned (e.g., coaxial) such that, relative to valves with side-by-side valve members, the linear "span" (shown in FIG. 1) in which the entire flow of gas through the valve 100 is controlled via the first and second valve members 112, 114 and first and second valve seats 102, 104 may be reduced while simultaneously providing an effective gas flow capacity sufficient to support burner operation. By way of example only, one particular embodiment includes a linear "span" reduced to a length of not more than 0.75 inches while simultaneously providing an effective gas flow capacity sufficient to support burner operation at a level of at least about 100,000 British Thermal Units (BTUs). This specific dimension (0.75 inches) and numerical value (100,000 BTUs) disclosed in this paragraph are provided for purpose of illustration only as they are example in nature and do not limit the scope of the present disclosure. All numerical dimensions and values are provided in this application for illustrative purposes only, as the particular dimensions and values (e.g., relating to burner operation levels, etc.) provided are not intended to limit the scope of the present disclosure as they may be varied depending on the particular application and/or end use.

The valve apparatus 100 may be a single stage valve that provides a single outlet operating capacity, a two-stage valve that provides for at least two distinct operating capacities, or a modulating valve that provides for variable capacity operation. The coil 120 and armature 122 of the valve apparatus 100 may be part of a solenoid, a stepper-motor, or other suitable device for displacing an armature in response to a voltage applied to at least one coil. For example, the coil 120 may be part of a linear displacement stepper-motor that displaces the armature 122 based on an applied voltage to at least one coil of the stepper-motor. The coil 120 may be a solenoid coil that is configured such that the armature 122 is operable for moving the second valve member 114 relative to the second valve seat 104 to vary the opening area therebetween based on a magnitude of the generated magnetic field, which, in turn, may be dependent on an input voltage applied to the coil 120. Accordingly, the armature 122 can collectively move the first valve member 112 and second valve member 114 (move both members as a single unit) away from their respective valve seats 102 and 104 and thus vary the opening area between the first and second valve members 112, 114 and their respective first and second valve seats 102, 104, to thereby control pressure at the outlet 106.

The valve apparatus 100 may be operated as a stand-alone device without inclusion of any pressure sensing apparatus. Or, the valve apparatus 100 may be used in combination with a pressure sensing apparatus as disclosed herein.

By controlling the input voltage that is applied to generate a magnetic field to move the armature 122, the valve apparatus 100 can vary the extent of opening area between the first and second valve seats 102, 104 and the first and second valve members 112, 114, which changes the pressure at the outlet 106. TABLE 1 below shows various example input voltages to the valve apparatus 100, and the corresponding pressure level established where the armature 122 moves upward to displace the first valve member 112 and second valve member 114 away from the valve seats 102, 104.

TABLE 1

| UPWARD MOVEMENT OF ARMATURE | |
|---|---|
| Pressure (inches water column) | Input Voltage (volts) - Upward Movement |
| 6.0 | 1.9 |
| 5.4 | 1.76 |
| 4.8 | 1.60 |
| 4.1 | 1.46 |
| 3.3 | 1.30 |
| 2.5 | 1.15 |
| 1.9 | 1.01 |
| 0 | 0 |

Because of hysteresis associated with movement of the armature 122, an input voltage of 1.6 volts that is applied to move the armature 122 upward may not establish the same valve position as an input voltage of 1.6 volts that is applied to move the armature 122 downward. Depending on whether the armature 122 moves upward or downward, an input voltage of 1.6 volts will establish different outlet pressures. Such outlet pressure differences are illustrated in TABLE 2 below, which shows the pressure established by various example input voltages where the armature 122 moves downward to move the first valve member 112 and second valve member 114 towards the valve seats 102, 104.

TABLE 2

DOWNWARD MOVEMENT OF ARMATURE

| Pressure (inches water column) | Input Voltage (volts) - Downward Movement |
|---|---|
| 5.6 | 1.89 |
| 5.0 | 1.74 |
| 4.4 | 1.60 |
| 3.7 | 1.44 |
| 3.0 | 1.31 |
| 2.3 | 1.16 |
| 1.6 | 1.00 |
| 0 | 0 |

Accordingly, a given input voltage applied to the coil 120 (as shown in FIG. 1) may not establish a set outlet pressure. Because the temperature of the coil 120 may increase over time with continued use and increase the resistance of the coil 120, a set input voltage level applied to the coil 120 at different times would not then result in the same current amperage through the coil 120 as a result of increased coil resistance due to temperature rise. This means that a given input voltage level applied to the coil 120 at different times may not generate the same magnetic field magnitude, which may result in variable displacement of the armature 122 and first and second valve members 112, 114. This would result in inconsistent opening areas that would cause an inconsistent pressure at the outlet 106. Accordingly, some exemplary embodiments may include the valve apparatus 100 in combination with a pressure sensing apparatus as disclosed herein. In such exemplary embodiments, the pressure sensing apparatus may include a pressure sensor diaphragm providing a control signal for controlling operation of the coil to modulate gas flow through the valve apparatus 100 (without a direct mechanical linkage between a regulator diaphragm and any valve member) as explained below.

According to additional aspects of the present disclosure, exemplary embodiments are provided of pressure sensing apparatus configured to be in communication with pressurized volumes in valves. In such exemplary embodiments, the pressure sensing apparatus is configured to provide an output that is indicative of a sensed pressure at or near an outlet of the valve. The output indicative of sensed pressure may be utilized for controlling the voltage applied to a coil (e.g., coil 120 of valve apparatus 100 (FIG. 1)), for example, to establish a desired operating capacity level. The output indicative of sensed pressure may be provided differently and/or in different forms in various embodiments of a pressure sensing apparatus as described below. By way of example only, a pressure sensor may include only a single diaphragm having a diameter less than about 1.5 inches that is utilized in control of a valve apparatus having an effective flow capacity sufficient to support burner operation up to at least about 180,000 British Thermal Units.

Figure 3:
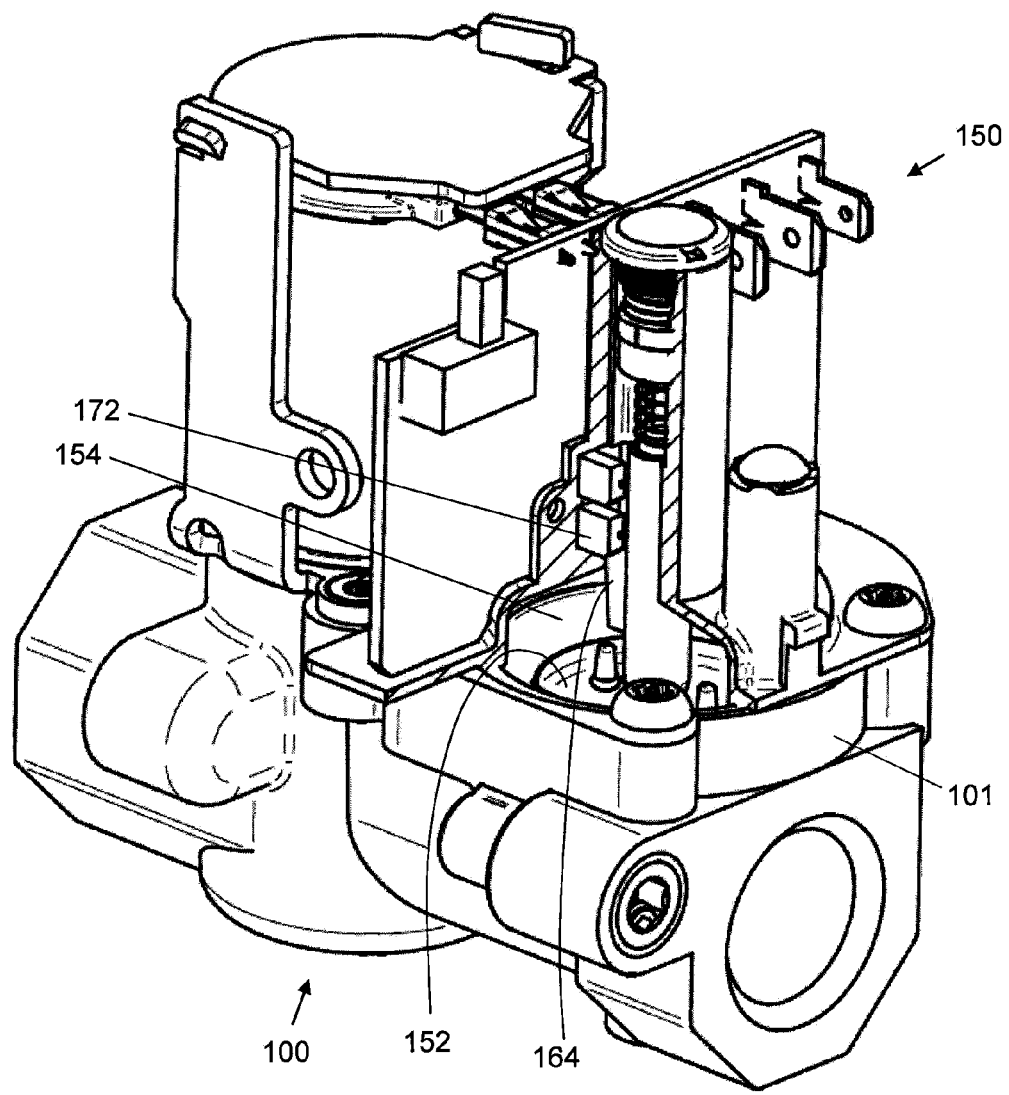
FIG. 3 is a cut-away view of the valve shown in FIG. 1, and illustrating an exemplary embodiment of a pressure sensing apparatus.

Referring now to FIG. 3, the valve apparatus 100 is shown with a portion cut away to reveal an exemplary embodiment of a pressure sensing apparatus 150. The pressure sensing apparatus 150 is generally configured to vary an amount of light transmitted to a light sensing device 172 in response to changes in pressure applied to a diaphragm 152. The light sensing device 172 provides a voltage output that is commensurate with the amount of sensed light and indicative of sensed pressure.

Figures 4, 5:
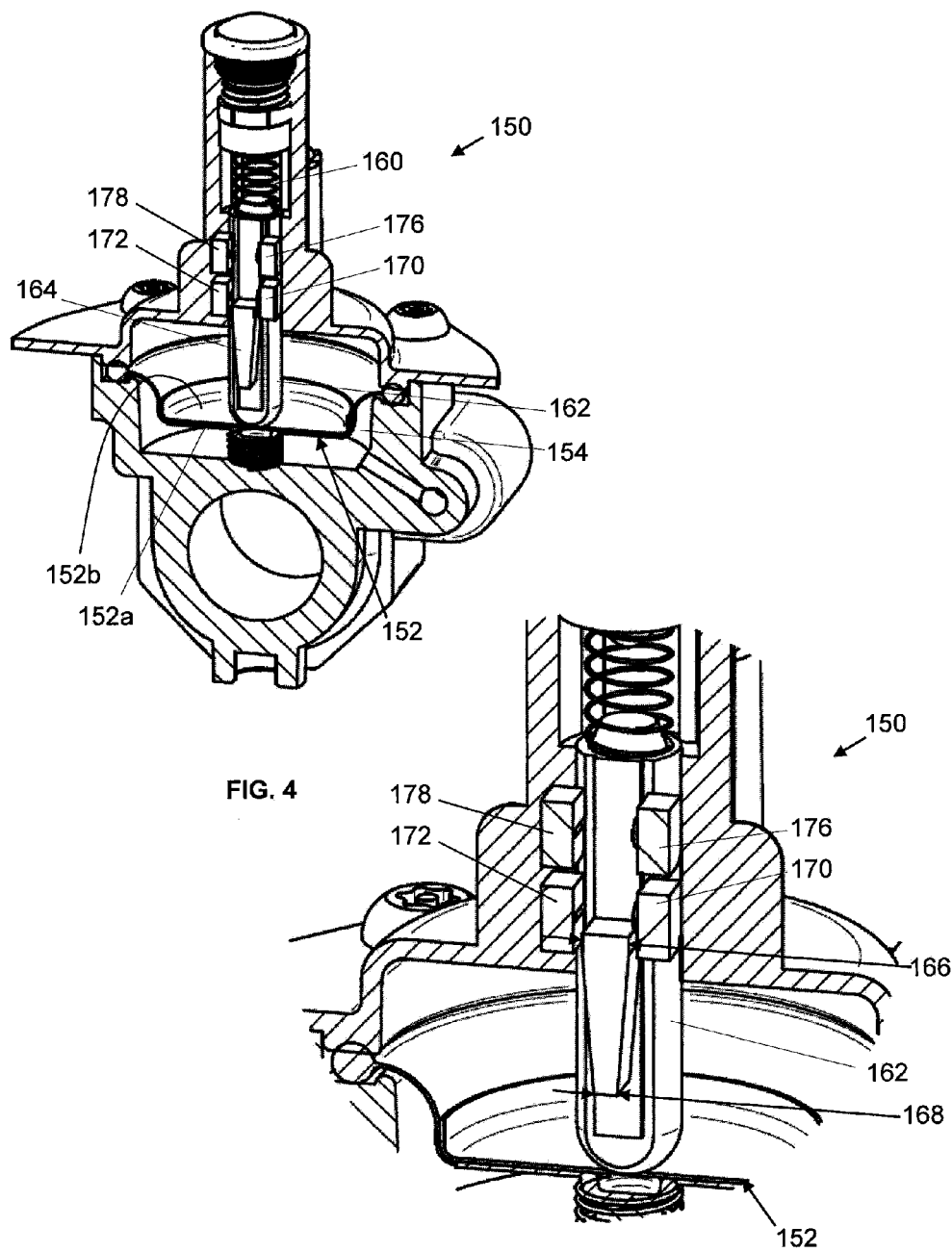
FIG. 4 is a cut-away view of the pressure sensing apparatus shown in FIG. 3.
FIG. 5 is another cut-away view of the pressure sensing apparatus shown in FIG. 3.

As shown in FIG. 4, the diaphragm 152 includes first and second sides 152a, 152b. The first side 152a is in communication with a pressurized volume within the valve apparatus, such that the diaphragm 152 is moveable in response to changes in pressure acting against the first side 152a.

The pressure sensing apparatus 150 further includes a light attenuator 164 that is moved by the diaphragm 152, such that changes in pressure causes the diaphragm 152 to raise or lower the light attenuator 164. The light attenuator 164 is configured to vary or attenuate the amount of light transmitted through the light attenuator 164 to the light sensing device 172 as the light attenuator 164 is moved by the diaphragm 152 in response to changes in pressure.

By way of example, the light attenuator 164 may have a variable thickness configured to reduce the amount of incident light that is transmitted through the light attenuator 164 as a function of the thickness of the light attenuator 164. Alternatively, the light attenuator 164 may be made of a translucent material and include an opaque line having a tapering thickness to vary or attenuate the amount of light transmitted through the light attenuator 164 as it is moved by the diaphragm 152. As a further example, the light attenuator 164 may be made of a translucent material and include a linearly increasing pattern of opaque spots or lines thereon, or a controlled pattern of holes therein which vary or attenuate the amount of light transmitted through the light attenuator 164 as it is moved by the diaphragm 152. The light attenuator 164 may also be made of an opaque material and include a slot having a tapering width for varying or attenuating the amount of light transmitted therethrough as the light attenuator 164 is moved by the diaphragm 152.

With continued reference to FIG. 4, the pressure sensing apparatus 150 also includes a light emitter 170 and a light sensing device 172. The light emitter 170 and light sensing device 172 are positioned relative to the light attenuator 164 such that the attenuating portion of the light attenuator 164 moves up and down between the light emitter 170 and light sensing device 172 in response to changes in pressure. In turn, the light sensing device 174 then responsively provides a voltage output commensurate with the amount of light transmitted through the light attenuator 164 and sensed by the light sensing device 172, which voltage output is indicative of a sensed pressure acting against the diaphragm 152.

With regard to communication with an outlet, the diaphragm 152 may, for example, be disposed in a sensing chamber 154 that is in communication with an outlet 106 via an orifice 156 provided between the outlet 106 of the valve apparatus 100 and the sensing chamber 154 (see FIG. 1). While the diaphragm 152 shown in FIG. 3 is disposed within a sensing chamber 154 in the valve body 101, the diaphragm 152 may alternatively be disposed within a housing (not shown) separate from the valve apparatus 100 but in communication with the outlet 106 of the valve apparatus 100.

With regards to the light attenuator 164 being movable by the diaphragm 152, the light attenuator 164 may be disposed on a pin 162 (FIG. 4) biased by a spring 160 against the second side 152b of the diaphragm 152 (opposite the first side 152a). Accordingly, changes in pressure communicated to the sensing chamber 154 cause the diaphragm 152 to raise or lower the pin 162, thus raising or lowering light attenuator 164.

In the illustrated embodiment, the light attenuator 164 has a variable thickness and is disposed on a portion of the pin 162. The light emitter 170 and a light sensing device 172 are positioned relative to the pin 162 and light attenuator 164, such that the light attenuator 164 is moveable up and down between the light emitter 170 and the light sensing device 172 in response to changes in outlet pressure that move the diaphragm 152.

The light emitter 170 may include a bulb, light emitting diode (LED), or other similar light emitting devices. The light sensing device 172 may comprise an optical sensor, photovoltaic cell, or a transistor having a collector base configured to produce an output voltage in response to detecting incident light. As shown in FIG. 5, the light emitter 170 and light sensing device 172 are aligned with and spaced apart from each other, such that the light emitter 170 is directed at the light sensing device 172. One example of such a light emitter 170 and light sensing device 172 is a RPI 579 photo interrupter manufactured by Rohm Semiconductor.

As stated above, the light attenuator 164 is configured to vary or attenuate the amount of light transmitted through the light attenuator 164 to the light sensing device 172 as the light attenuator 164 is moved by the diaphragm 152 in response to changes in pressure. For example, the light attenuator 164 may be made of a translucent material that has sufficient light permeability to allow a portion of incident light (light that falls on a surface) to be transmitted through the light attenuator 164, yet a sufficient amount of opacity that is effective to impede light transmission so as to reduce the amount of light transmitted through the light attenuator 164 as a function of the thickness of the light attenuator 164. Through extensive experimentation, numerous materials were found to be unacceptable due to excessive translucency and insufficient opacity to impede light and yield a measurable reduction in light. Extensive experimentation also identified numerous materials that were unacceptable due to insufficient translucency and excessive opacity that effectively blocked all light transmitted through the light attenuator 164. Through extensive experimentation and testing, suitable materials were found that possessed sufficient light permeability to allow some incident light to be transmitted through the light attenuator 164, and sufficient opacity to impede light transmission so as to reduce the amount of light transmitted through the light attenuator 164 as a function of the thickness. Exemplary suitable materials include 420 Polybutylene Terephthalate (Valox PBT) manufactured by Sabic Innovative Plastics, or Polybutylene Terephthalate Natural (Valox 357-BK1001) and Plexiglass 3165 Black. In an example embodiment, the light attenuator 164 has a variable thickness configured to reduce the amount of incident light that is transmitted through the light attenuator 164 as a function of the thickness of the light attenuator 164. In thicknesses of between 0.125 and 0.020 inches, the above materials sufficiently impede incident light to yield a light sensor voltage output in the range of 0 to 5 volts respectively as explained below.

As shown in FIGS. 3-6, the illustrated light attenuator 164 has a generally wedge-shaped configuration with a width that gradually increases over its length from bottom to top. By way of example, the width of the light attenuator 164 may gradually taper over a length (e.g., of at least about 0.250 inches) so as to provide a sufficient thickness gradient to enable detection of incremental changes in the amount of light transmitted through the light attenuator 164 over its length. Continuing with this example, the widest portion of the light attenuator 164 has a thickness 166 of at least 0.090 inches, while the narrowest or thinnest portion of the light attenuator 164 has a thickness 168 of not more than 0.030 inches.

The portion of the light attenuator 164 that is located farthest from the diaphragm 152 has the greatest thickness 166, while the portion of the light attenuator 164 that is located closest to the diaphragm 152 has the thinnest thickness 168. As such, an increase in pressure, which would raise the diaphragm 152 and move a thinner portion of the light attenuator 164 between the light emitter 170 and light sensing device 172, would result in an increase in the amount of light transmitted to the light sensing device 172. Similarly, a decrease in pressure, which would lower the diaphragm 152 and move a thicker portion of the light attenuator 164 between the light emitter 170 and light sensing device 172, would result in a decrease in the amount of light transmitted to the light sensing device 172. The light sensing device 172 responsively provides a voltage output that is commensurate with the amount of light transmitted though the light attenuator 164 and detected by the light sensing device 172. Thus, an increase or decrease in outlet pressure correspondingly yields an increase or decrease in voltage output that is indicative of a sensed pressure.

The light emitter 170 and light sensing device 172 may experience a drift or decline in output after the devices are operated for extended periods of time. For example, the light emitted by an LED may decay or decline over time, and the ability of the light sensing device 172 to detect light level may decline over time. In this exemplary embodiment, the pressure sensing apparatus 150 may thus be configured to perform a novel self-calibration of the output voltage for the detected amount of light transmission with the associated position of the light attenuator 164. The light sensing device 172 is configured to provide a voltage output that changes from a substantially maximum voltage output to a fractional voltage output upon detecting movement of the light attenuator 164 from a position in which the light attenuator 164 is not between the light emitter 170 and light sensing device 172 to a position in which a portion of the light attenuator 164 is between the light emitter 170 and light sensing device 172. The light sensing device 172 is configured to thereafter provide a voltage output level that enables the pressure sensing apparatus 150 to calibrate current voltage output of the light sensing device 172 with the actual known position of the light attenuator 164 relative to the light sensing device 172. Accordingly, once the known position of the light attenuator 164 is detected when it moves from a non-diffusing to a diffusing position between the light emitter 170 and the light sensing device 172, any decrease relative to a prior value of sensed light/voltage output caused by decay of the light emitter 170 (or light sensing device 172) is utilized as an error, for offsetting the desired voltage set-point associated with a desired pressure setting. In this exemplary manner, the pressure sensing apparatus 150 is configured to calibrate itself to compensate for drift or decay in the output of the light emitter 170 or light sensing device 172.

As shown in FIGS. 4 and 5, the pressure sensing apparatus 150 may also include a second or redundant light emitter 176 and a second or redundant light sensing device 178. The light emitter 176 and light sensing device 178 may be employed for calibrating the light emitter 170 and light sensing device 172.

The above described pressure sensing apparatus 150 may be used in combination with the valve apparatus 100 shown in FIG. 1. Utilizing the above pressure sensing apparatus 150, a desired full capacity operating pressure setting for the valve apparatus 100 may be set (after manufacture or upon installation) by adjusting the force of the biasing spring 160 using a screw or similar device to compress the spring against the diaphragm 152. The resulting higher spring biasing force would therefore need to be counterbalanced by a higher operating pressure acting against the diaphragm 152, to maintain the position of the light attenuator 164 between the light emitter 170 and the light sensing device 172. To illustrate this in an example, the desired operating pressure at full capacity for the valve apparatus 100 may be set at 3½ inches of water column at which the pressure sensing apparatus 150 may provide an output voltage of about 3.0 volts, for example. A subsequent increase in outlet pressure above the 3½ inches full capacity operating pressure would increase the light sensing device's output voltage level (to 3.5 volts for example), where the voltage applied to the coil 120 is subsequently adjusted to move the second valve member 114 closer to the second valve seat 104 and reduce the pressure at the outlet to achieve the desired pressure setting. To illustrate the above, the TABLE below provides exemplary sensor output voltages and corresponding sensed outlet pressures.

TABLE 3

| Pressure (inches water column) | Light Sensing Device Output (volts) |
| --- | --- |
| 9.5 | 5.00 |
| 8.0 | 4.25 |
| 6.5 | 3.50 |
| 5.0 | 2.75 |
| 3.5 | 2.00 |
| 2.1 | 1.25 |

In heating appliances that provide multiple levels of heating operation or variable heating output, the input voltage that is applied to the coil 120 can be controlled for reducing the opening area between the valve members 112, 114 and valve seats 102, 104 to establish low-stage heating (e.g., less than full capacity operation). For example, the input voltage applied to the coil 120 can be controlled to reduce the opening area relative to the valve seats 102, 104 to establish an outlet pressure of about 2.1 inches of water column corresponding to a reduced heating capacity level, and thereafter control the input voltage to the coil 120 based on the sensed pressure output voltage to adjustably displace the valve member as needed to maintain the desired outlet pressure of about 2.1 inches of water column. This approach is contrary to a stepper-motor that moves a given number of steps to move a valve member to a single displacement position (or conventional valves that move a valve member to a set displacement position), which single displacement position is expected to provide the desired outlet pressure.

Unlike some conventional valves that operate to move a valve member to a set displacement position that is expected to provide a desired outlet pressure, the valve apparatus 100 senses pressure at the outlet 106 and continuously controls input voltage for solenoid activation to adjust the displacement of at least one valve member (e.g., 112, 114) relative to at least one valve seat (102, 104) as needed to achieve and maintain a desired outlet pressure, which may be a full operating pressure of 3.5 inches of water column, a low-stage operating pressure of 2.1 inches of water column, or any number of desired operating pressures therebetween. By obtaining an output voltage indicative of the sensed pressure at the valve outlet 106, the input voltage to the coil 120 can be controlled to account for increases in temperature and resistance of the coil 120, increases or decreases in pressure at an inlet of the valve apparatus 100, and increases or decreases in pressure downstream of the outlet 106. Thus, the input voltage to the coil 120 can be controlled based on an output indicative of sensed outlet pressure to continually maintain the pressure at the outlet 106 at a desired operating pressure.

Figure 10:
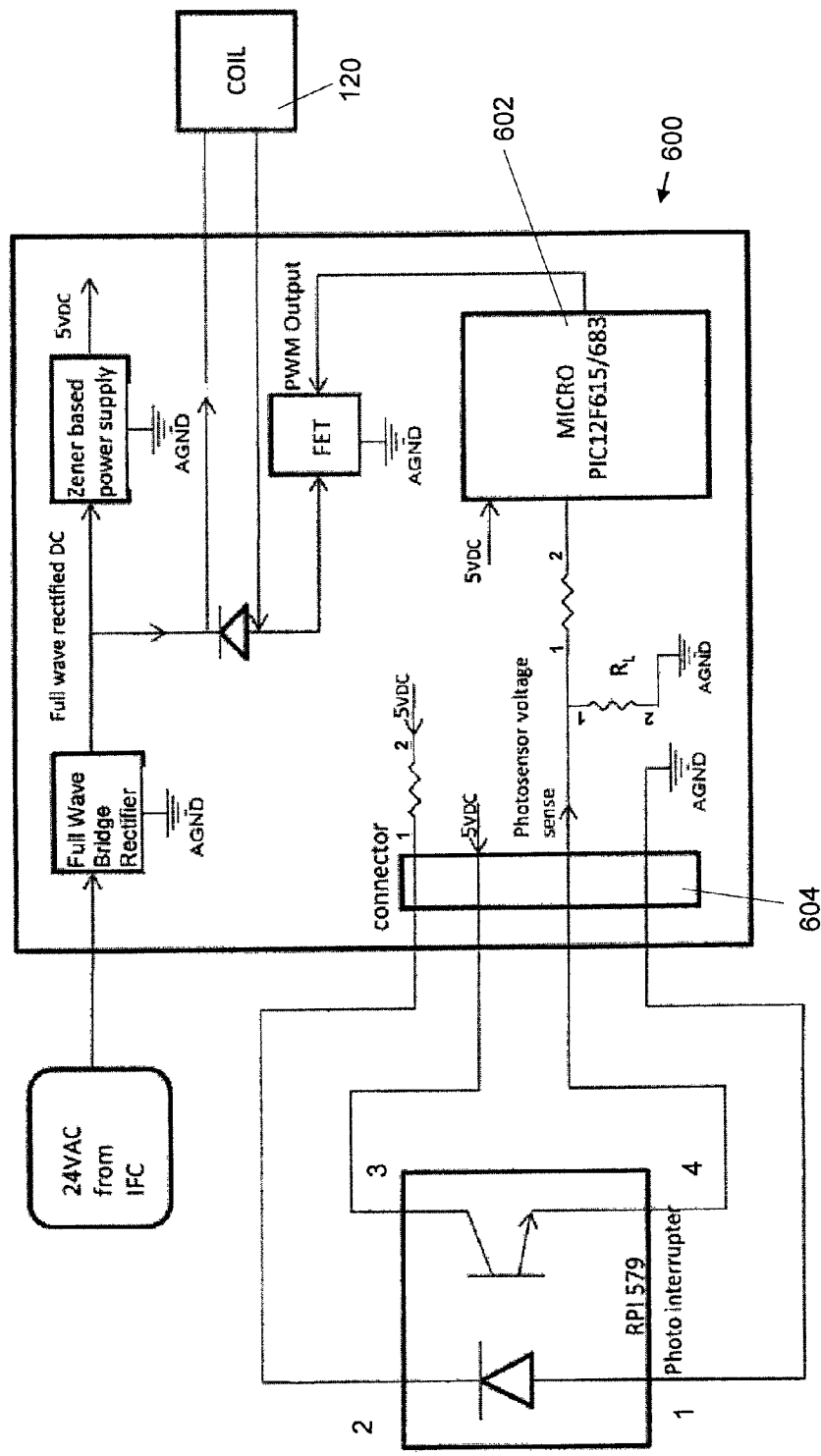
FIG. 10 is a schematic diagram of an exemplary embodiment of a controller for a valve according to the principles of the present disclosure.

In exemplary embodiments, the pressure sensing apparatus 150 (FIGS. 3-5) and valve apparatus 100 (FIG. 1) may be used together or in combination, for adjusting gas flow for varying heating output of a heating apparatus or appliance. In additional or alternative exemplary embodiments, the pressure sensing apparatus 150 (FIGS. 3-5) and valve apparatus 100 (FIG. 1) may further be used in combination with a controller or control system for controlling the operation of the valve apparatus based on the sensed pressure. Accordingly, exemplary embodiments disclosed herein may include the valve apparatus 100, the pressure sensing apparatus 150, and a controller. With reference now to FIG. 10, there is shown a controller, control system, or control 600, which may be coupled to the pressure sensing apparatus 150 and to the coil 120 of valve apparatus 100. In this exemplary embodiment, the controller 600 is configured to determine a sensed pressure from the output voltage of the pressure sensing apparatus 150 and to adjust the application of input voltage to the coil 120 based on the sensed pressure, to thereby adjust the opening area between at least the second valve member 114 and second valve seat 104 to achieve a desired outlet pressure.

Figure 6:
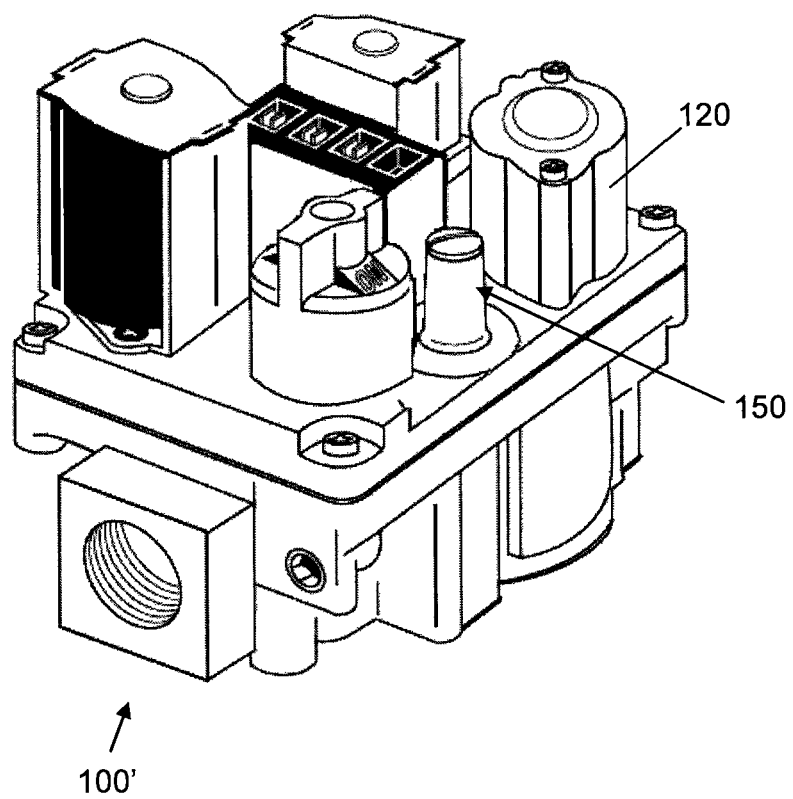
FIG. 6 is a perspective view of another exemplary valve apparatus in combination with the pressure sensing apparatus shown in FIGS. 4 and 5.

The pressure sensing apparatus 150 may alternatively be incorporated in or used with different valves other than a modulating valve or the valve apparatus 100. For example, FIG. 6 illustrates a valve apparatus 100' in which the pressure sensing apparatus 150 may also be used. In this example embodiment, the valve apparatus 100' includes a valve member (not shown) that moves relative to a valve seat (not shown) in response to an input voltage applied to a coil 120. One such example of a valve apparatus is a 36E27 modulating gas valve manufactured by the White-Rodgers Division of Emerson Electric Co. Accordingly, this embodiment includes the valve apparatus 100' (FIG. 6) in combination with the pressure sensing apparatus 150 (FIGS. 3-5) for adjusting gas flow for varying heating output of a heating apparatus.

In additional or alternative exemplary embodiments, the pressure sensing apparatus 150 (FIGS. 3-5) and valve apparatus 100' (FIG. 6) may further be used in combination with a controller or control system for controlling the operation of the valve apparatus 100' based on the sensed pressure. Accordingly, exemplary embodiments disclosed herein may include the valve apparatus 100', the pressure sensing apparatus 150, and a controller. With reference to FIG. 10, there is shown a controller or control system 600, which may be coupled to the pressure sensing apparatus 150 and to the coil 120 of valve apparatus 100'. In this exemplary embodiment, the controller 600 is configured to determine a sensed pressure from the output voltage of the pressure sensing apparatus 150 and to adjust the application of input voltage to the coil 120 based on the sensed pressure, to thereby adjust the opening area between the valve member and valve seat to achieve a desired outlet pressure.

Figure 7:
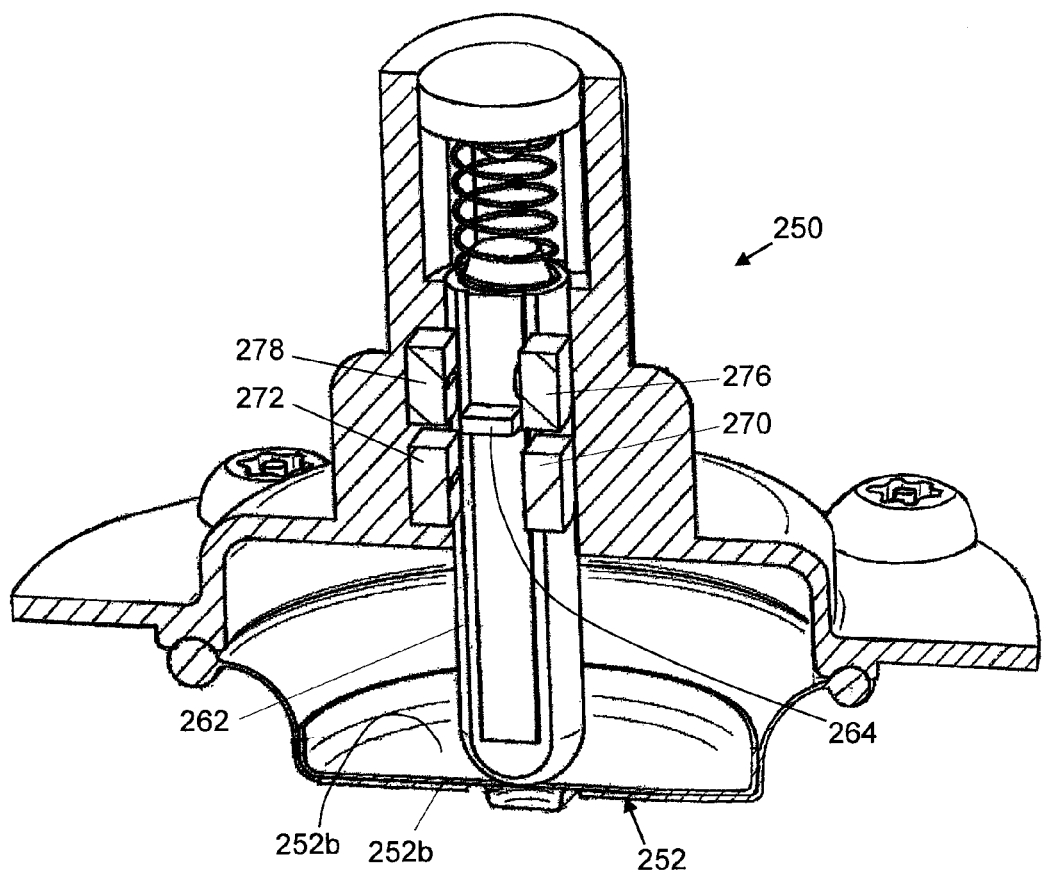
FIG. 7 is a cross-sectional view of a second embodiment of a pressure sensing apparatus according to the principles of the present disclosure.

FIG. 7 illustrates another exemplary embodiment of a pressure sensing apparatus 250, which may be used in any one or more of the valve apparatus (e.g., 100, 100', etc.) disclosed herein or other suitable valves (e.g., 36E27 modulating gas valve, etc.). As shown in FIG. 7, the pressure sensing apparatus 250 includes a diaphragm 252, a light interrupter 264, first and second light emitters 270, 276, and first and second light sensing device 272, 278.

The diaphragm 252 includes first and second sides 252a, 252b. The first side 252a is in communication with a pressurized volume within the valve apparatus, such that the diaphragm 252 is moveable in response to changes in pressure acting against the first side 252a of the diaphragm 252. The light interrupter 264 is moved by the diaphragm 252, such that changes in pressure acting against the diaphragm 252 causes the diaphragm 252 to raise or lower the light interrupter 264.

In this exemplary embodiment, the light interrupter 264 is comprised of a material configured to substantially impede transmission of light through the light interrupter 264. The material of the light interrupter 264 may have a given thickness that is uniform or constant, and thus not varying or gradually tapering.

The light emitters 270, 276 and light sensing devices 272, 278 are positioned relative to the light interrupter 264 (on opposite sides thereof), so as to detect movement of the light interrupter 264 therebetween. In this example, the first light emitter 270 and first light sensing device 272 are positioned on opposite sides of the light interrupter 264 to detect when the diaphragm 252 is exposed to a first pressure at which the diaphragm 252 moves the light interrupter 264 between the first light emitter 270 and first light sensing device 272. The second light emitter 276 and second light sensing device 278 are positioned on opposite sides of the light interrupter 264 higher than or above the first light emitter 270 and first light sensing device 272. In this exemplary manner, the second light emitter 276 and second light sensing device 278 are able to detect when the light interrupter 264 is moving between the second light emitter 276 and second light sensing device 278 when the diaphragm 252 is exposed to a second pressure higher than the first pressure. Accordingly, a desired pressure of a valve (e.g., valve apparatus 100 or 100', etc.) with an outlet in communication with the diaphragm 252 can be established by interpolating between first and second positions of the valve (e.g., first and second voltages applied to a coil to establish first and second valve member displacements) at which the light interrupter 264 is detected by the first and second light sensing devices 272, 278 corresponding to the first and second pressures, as explained below.

In operation (e.g., at the time of manufacture), a first outlet pressure is measured when the light interrupter 264 is detected between the first light emitter 270 and first light sensing device 272. When the light interrupter 264 is detected between the second light emitter 276 and second light sensing device 278, a second outlet pressure is measured. From the known positions of the first and second sensors 272, 278 associated with the first and second outlet pressures, a desired outlet pressure between the first outlet pressure and the second outlet pressure can be established by interpolating between first and second valve member positions (or first and second voltages applied to the valve's coil) associated with the known locations of the first and second light sensing devices 272 and 278 corresponding to the first and second outlet pressures. Control of valve member position (or voltage applied to the coil) can include interpolation between input voltages to the coil corresponding to the positions of the first and second light sensors 272, 278 to determine any number of adjustable positions between the first outlet pressure and second outlet pressure.

In exemplary embodiments, the pressure sensing apparatus 250 (FIG. 7) may be used together or in combination with valve apparatus 100 (FIG. 1), valve apparatus 100' (FIG. 6), or any other suitable valve for adjusting gas flow for varying heating output of a heating apparatus or appliance. By way of further example, the pressure sensing apparatus 250 may alternatively be incorporated in or used with different valves other than a modulating valve, the valve apparatus 100, or the valve apparatus 100'. For example, the pressure sensing apparatus 250 may be used with or incorporated into a 36E27 modulating gas valve manufactured by the White-Rodgers Division of Emerson Electric Co.

In additional or alternative exemplary embodiments, the pressure sensing apparatus 250 (FIG. 7) and valve apparatus (e.g., valve apparatus 100 (FIG. 1), valve apparatus 100' (FIG. 6), etc.) may further be used in combination with a controller or control system (e.g., controller 600 (FIG. 10), etc.) for controlling the operation of the valve apparatus based on the sensed pressure. Accordingly, exemplary embodiments disclosed herein may include the valve apparatus 100 or 100', the pressure sensing apparatus 250, and the controller 600 where the controller 600 is coupled to the pressure sensing apparatus 250 and the coil 120. The controller 600 may be configured to determine a sensed pressure from the output of the pressure sensing apparatus 250 and to adjust the application of input voltage to the coil 120 based in part on the sensed pressure to adjust the opening area between the valve member and valve seat to achieve a desired outlet pressure. Thus, a desired pressure of the valve apparatus can be established based on the output of the pressure sensing apparatus 250.

Figure 8:
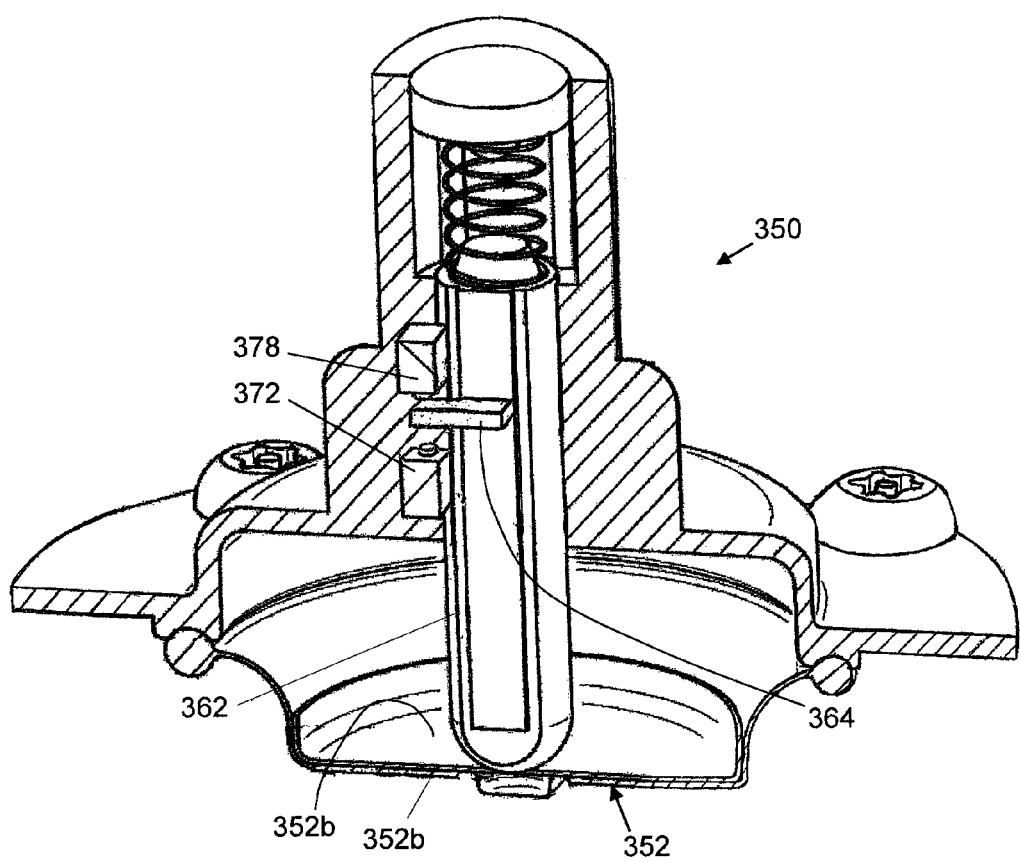
FIG. 8 is a cross-sectional view of a third embodiment of a pressure sensing apparatus according to the principles of the present disclosure.

FIG. 8 illustrates another exemplary embodiment of a pressure sensing apparatus 350, which may be used in any one or more of the valve apparatus (e.g., 100, 100', etc.) disclosed herein or other suitable valves (e.g., 36E27 modulating gas valve, etc.). As shown in FIG. 8, the pressure sensing apparatus 350 includes a diaphragm 352 having first and second sides 352a, 352b. The first side 352a is in communication with a pressurized volume within the valve apparatus, such that the diaphragm 352 is moveable in response to changes in pressure acting against the first side 352a of the diaphragm 352.

A moveable switch trigger 364 is moved by the diaphragm 352 such that a change in pressure acting against the diaphragm 352 causes the diaphragm 352 to raise or lower the switch trigger 364. The pressure sensing apparatus 350 also includes first and second switch devices 372, 378. The first switch device 372 is positioned to detect the moveable switch trigger 364 when the diaphragm 352 is exposed to a first pressure. The second switch device 378 is positioned above the first switch device 372 and is operable to detect the moveable switch trigger 364 when the diaphragm 352 is exposed to a second pressure higher than the first pressure. The first switch device 372 and the second switch device 378 responsively provide an output that is indicative of the first pressure and second pressure.

As shown in FIG. 8, the switch trigger 364 is disposed on a pin 362 that is biased against the diaphragm 352, such that changes in pressure acting against the diaphragm 352 cause the diaphragm 352 to raise or lower the pin 362 and switch trigger 364. The switch trigger 364 extends from and outwardly beyond the pin 362 in a generally perpendicular orientation to the pin 362. The first sensor/switch device 372 is located below the second sensor/switch device 378, such that the switch trigger 364 is moveable up and down between the first and second sensor/switch devices 372, 378.

The first sensor/switch device 372 is positioned relative to the switch trigger 364 such that the switch trigger 364 engages or causes the first switch device 372 to switch. The first sensor/switch device 372 is preferably positioned below the nominal position of the switch trigger 364 at which nominal position the valve member would be operating to provide a desired rated outlet pressure. The second sensor/switch device 378 is located above the nominal position of the switch trigger 364.

In operation (e.g., at the time of manufacture), a first outlet pressure is measured when the first sensor/switch device 372 detects contact with the switch trigger 364. When the second sensor/switch device 378 detects contact with the switch trigger 364, a second outlet pressure is measured. From the known positions of the first sensor/switch device 372 and second sensor/switch device 378 associated with the first and second outlet pressures, a desired outlet pressure between the first outlet pressure and the second outlet pressure can be established by interpolating between first and second valve positions (or first and second voltages applied to a valve coil) associated with the known locations of the first sensor/switch device 372 and second sensor/switch device 378 corresponding to the first and second outlet pressures. Control of valve member position (or voltage applied to the coil) can include interpolation between input voltages to the coil corresponding to the positions of the first sensor/switch device 372 and second sensor/switch device 378 to determine any number of adjustable positions between the first outlet pressure and second outlet pressure.

In exemplary embodiments, the pressure sensing apparatus 350 (FIG. 8) may be used together or in combination with valve apparatus 100 (FIG. 1), valve apparatus 100' (FIG. 6), or any other suitable valve for adjusting gas flow for varying heating output of a heating apparatus or appliance. For example, the pressure sensing apparatus 350 may be used with or incorporated into a 36E27 modulating gas valve manufactured by the White-Rodgers Division of Emerson Electric Co.

In additional or alternative exemplary embodiments, the pressure sensing apparatus 350 (FIG. 8) and valve apparatus (e.g., valve apparatus 100 (FIG. 1), valve apparatus 100' (FIG. 6), etc.) may further be used in combination with a controller or control system (e.g., controller 600 (FIG. 10), etc.) for controlling the operation of the valve apparatus based on the sensed pressure. Accordingly, exemplary embodiments disclosed herein may include the valve apparatus 100 or 100', the pressure sensing apparatus 350, and the controller 600 where the controller 600 is coupled to the pressure sensing apparatus 450 and the coil 120. The controller 600 may be configured to determine a sensed pressure from the output of the pressure sensing apparatus 350 and to adjust the application of input voltage to the coil 120 based in part on the sensed pressure to adjust the opening area between the valve member and valve seat to achieve a desired outlet pressure. Thus, a desired pressure of the valve apparatus can be established based on the output of the pressure sensing apparatus 350.

Figure 9:
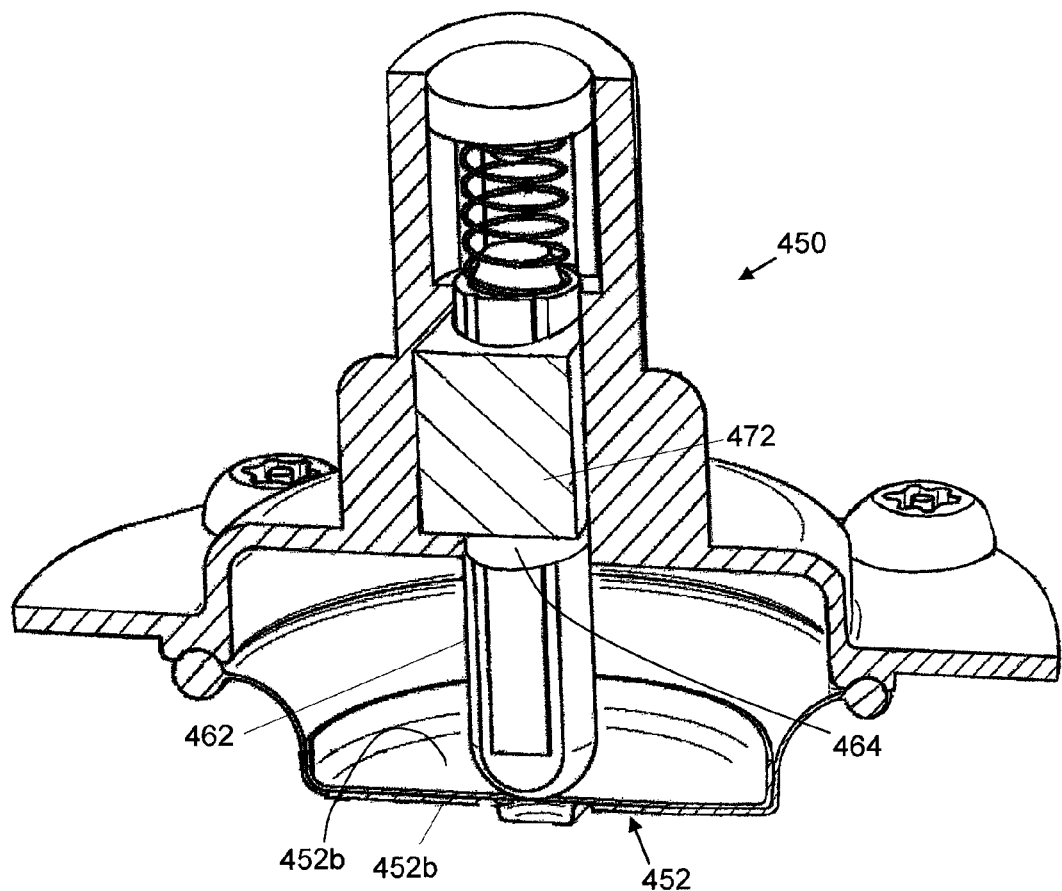
FIG. 9 is a cross-sectional view of a fourth embodiment of a pressure sensing apparatus according to the principles of the present disclosure.

FIG. 9 illustrates another exemplary embodiment of a pressure sensing apparatus 450, which may be used in any one or more of the valve apparatus (e.g., 100, 100', etc.) disclosed herein or other suitable valves (e.g., 36E27 modulating gas valve, etc.). As shown in FIG. 9, the pressure sensing apparatus 450 includes a diaphragm 452 having first and second sides 452a, 452b. The first side 452a is in communication with a pressurized volume within the valve apparatus, such that the diaphragm 452 is moveable in response to changes in pressure acting against the first side 452a of the diaphragm 452.

The pressure sensing apparatus 450 comprises a core 464 disposed on a diaphragm 452, such that the core 464 moves along with the diaphragm 452 in response to changes in pressure acting against the diaphragm 452. The core 464 moves relative to a transformer 472. The transformer 472 provides an output of a current that varies with movement of the core 464. The current output provided by the transformer 472 is commensurate with changes in the pressure acting against the diaphragm 452. The diaphragm 452 may be disposed within a valve body. Also in this example, the core 464 may be part of the transformer 472. In operation, an input voltage to a valve's coil (e.g., coil 120) may be controlled based on the output of the pressure sensing apparatus 450, to thereby adjust the opening area between a valve member and a valve seat to achieve a desired outlet pressure.

In exemplary embodiments, the pressure sensing apparatus 450 (FIG. 9) may be used together or in combination with valve apparatus 100 (FIG. 1), valve apparatus 100' (FIG. 6), or any other suitable valve for adjusting gas flow for varying heating output of a heating apparatus or appliance. For example, the pressure sensing apparatus 450 may be used with or incorporated into a 36E27 modulating gas valve manufactured by the White-Rodgers Division of Emerson Electric Co.

In additional or alternative exemplary embodiments, the pressure sensing apparatus 450 (FIG. 9) and valve apparatus (e.g., valve apparatus 100 (FIG. 1), valve apparatus 100' (FIG. 6), etc.) may further be used in combination with a controller or control system (e.g., controller 600 (FIG. 10), etc.) for controlling the operation of the valve apparatus based on the sensed pressure. Accordingly, exemplary embodiments disclosed herein may include the valve apparatus 100 or 100', the pressure sensing apparatus 450, and the controller 600 where the controller 600 is coupled to the pressure sensing apparatus 450 and the coil 120. The controller 600 may be configured to determine a sensed pressure from the output of the pressure sensing apparatus 450 and to adjust the application of input voltage to the coil 120 based in part on the sensed pressure to adjust the opening area between the valve member and valve seat to achieve a desired outlet pressure. Thus, a desired pressure of the valve apparatus can be established based on the output of the pressure sensing apparatus 450.

According to additional aspects of the present disclosure, exemplary embodiments are provided of controller or control systems for controlling a valve apparatus based on an output of a pressure sensing apparatus. For example, FIG. 10 illustrates an exemplary embodiment of a controller or control system 600, which may be used for controlling valve apparatus 100 (FIG. 1), valve apparatus 100' (FIG. 6), a 36E27 modulating gas valve, or other suitable valve based on an output of a pressure sensing apparatus, such as pressure sensing apparatus 150 (FIG. 6), 250 (FIG. 7), 350 (FIG. 8), 450 (FIG. 9), etc.

As shown in FIG. 10, the controller 600 includes a microprocessor 602 in communication with a pressure sensing apparatus that provides an output indicative of pressure in a pressurized volume in a valve apparatus, such as valve apparatus 100 shown in FIG. 1. The pressure sensing apparatus may be any of the above described pressure sensing apparatus 150, 250, 350, or 450, or alternatively may be any suitable pressure sensing apparatus that provides an output indicative of a pressure, such as a 2006V2 pressure transducer/sensor manufactured by Dytran having an output of 50 mV/psi. By way of further example, the microprocessor 602 may be a PIC 12F615/683 microprocessor manufactured by Microchip Technology, Inc.

The controller 600 and/or microprocessor 602 are configured to control the application of input voltage to a coil. Such a coil may be coil 120 shown in FIG. 1, which varies an opening area between the first and second valve members 112, 114 relative to at least the second valve seat 104 based on the magnetic field generated by the coil 120 that is dependent on the input voltage applied to the coil 120.

The controller 600 and/or microprocessor 602 are configured to determine a sensed outlet pressure from the output of the pressure sensing apparatus (e.g., 150, 250, 350 or 450), and to responsively adjust the application of input voltage to the coil 120 based on the sensed outlet pressure, to thereby adjust the opening area (e.g., area between the first and second valve members 112, 114 and second valve seat 104) to achieve a desired pressure at the outlet 106 of the valve apparatus 100.

The controller 600 may have an input connector 604 configured to receive an input signal from a furnace controller (not shown) requesting heating operation at a specific operating capacity level. The controller 600 and/or microprocessor 602 are configured to detect the presence of an input signal having a frequency that is indicative of a specific operating capacity level. For example, the input control signal may be a pulse width modulated (PWM) signal having a duty cycle ratio of between 4 percent and 95 percent, where the input signal may be a pulse width modulated signal, in which a duty cycle that varies between 4 percent and 95 percent respectively corresponds to an operating capacity level that varies between 35 percent and 100 percent of the full operating capacity level of the heating apparatus. The controller 600 and/or microprocessor 602 are configured to respond to the input control signal by generating a given input voltage signal to the coil 120 as described below.

The microprocessor 602 has a memory (e.g., programmable read-only-memory) encoded with one or more instructions operable to determine an input voltage to be applied to the coil 120 (shown in FIG. 1) to cause displacement of a valve member (e.g., first and second valve members 112, 114 in FIG. 1) to vary the gas pressure at the outlet 106 to correspond to the operating capacity level requested by a furnace controller (e.g., integrated furnace control (IFC)). The furnace controller may provide 24 volts alternating current to the controller 600 and microprocessor 602. The controller 600 and/or microprocessor 602 are configured to generate an input voltage signal for instructing or causing the coil 120 to move the valve member (e.g., first and second valve members 112, 114) a predetermined amount to establish a gas pressure corresponding to the desired operating capacity level, as explained below.

As shown in FIG. 10, the output of the photo interrupter (e.g., light sensor 172 (FIG. 3), etc.) is connected to an analog input/output pin on the microprocessor 602. A moving average of one or more outputs from the photo interrupter device may be used to determine the output of the photo interrupter device at any point in time, based on the analog to digital readings from the photo interrupter device. The photo interrupter preferably includes a transistor, which is operated in the active region. The output of the photo interrupter may vary between 0 and 5 volts direct current depending on the amount of incident light detected by the photo interrupter.

The microprocessor 602 is configured or programmed to include a photo interrupter output "set point" that corresponds to a desired sensed outlet pressure, for example, and may further include an allowable tolerance or oscillation (error band) relative to the set point. Such a set point and error band may be set in the software of the microprocessor 602. The microprocessor 602 initially (e.g., on power up) provides a pulse-width modulation (PWM) signal with a default duty cycle for a predetermined period of time to the Field Effect Transistor (FET) that controls the input voltage and/or signal that is applied to the coil 120 for varying the pressure at the outlet of the valve 100. After the predetermined period of time has elapsed, the error of the photo interrupter device output relative to the "set point" is determined. Based on the output of the photo interrupter device, a discrete time-based PID (proportional integral derivative) algorithm is used to determine the change in PWM signal's duty cycle (e.g., the ratio of time in which the signal is "high" relative to the time in which the signal is "low"), which will vary the input voltage or signal applied to the coil 120 for varying the pressure at the outlet to achieve the desired pressure and target/set point. When the determined error is within the allowable error band (e.g., as specified in the software), the PWM signal's duty cycle does not change.

Accordingly, the controller 600 and/or microprocessor 602 are configured to generate a control signal for controlling the application of an input voltage that is applied to a coil for displacing at least one valve member (e.g., 112, 114) relative to at least one valve seat (e.g., 102, 104) for establishing a desired outlet pressure corresponding to a desired operating capacity level. The microprocessor 602 is further configured to compare the output of the pressure sensing apparatus (e.g., 150, 250, 350, 450) that is indicative of the pressure at the outlet to a set point associated with a predetermined pressure value associated with the desired operating capacity level, to determine an error amount relative to the predetermined pressure value, and to determine a correction value associated with the control signal for the coil, for adjusting the displacement of the valve member (e.g., 112, 114) to achieve the desired outlet pressure corresponding to a desired operating capacity level. The microprocessor 602 is configured to generate a control signal for controlling application of input voltage that is applied to the coil 120 based on the determined correction value, to displace the valve member to substantially achieve the desired outlet pressure corresponding to the desired operating capacity level for the heating appliance.

Figure 11:
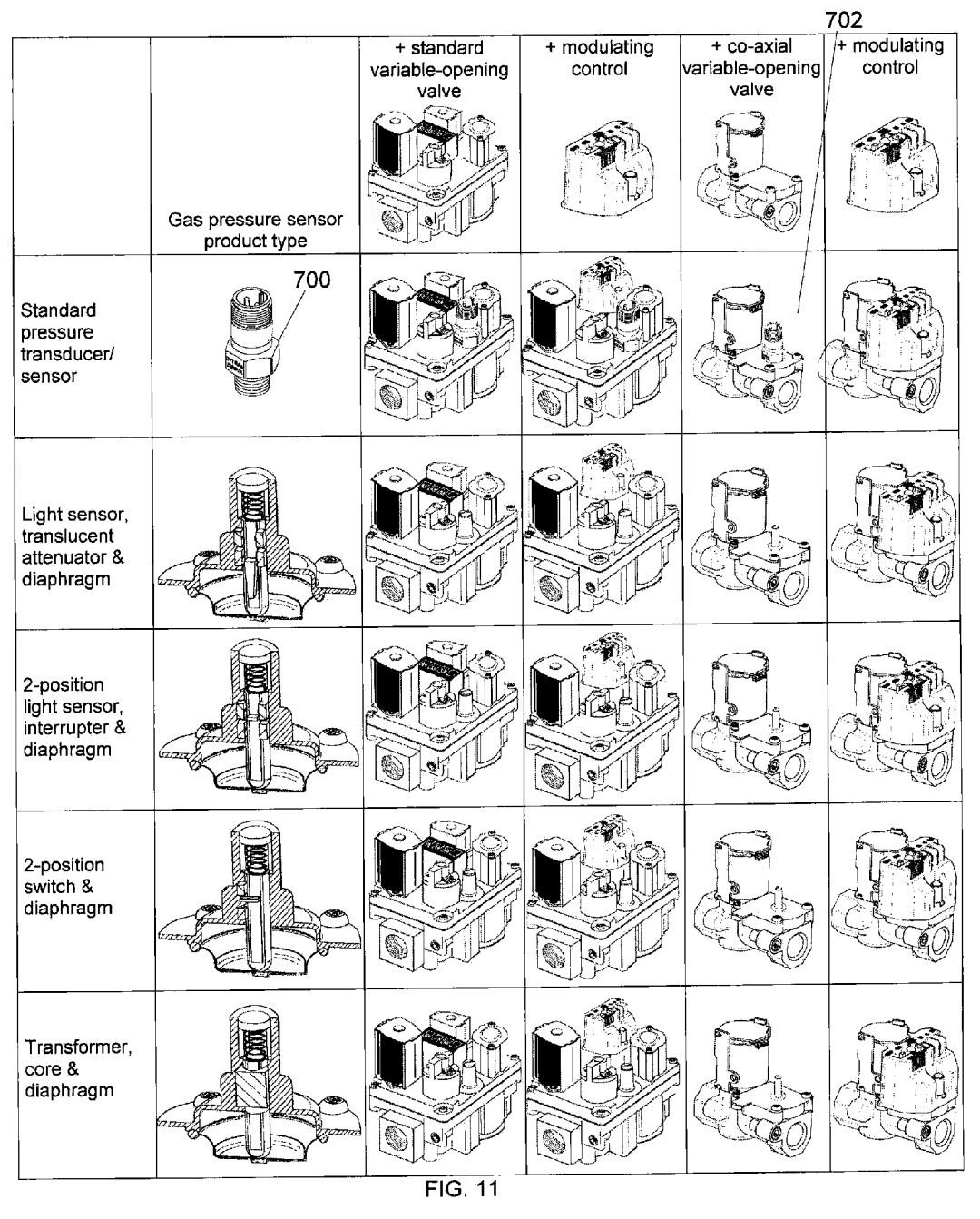

The controller 600 may generate a control signal other than a pulse width modulated signal, where the signal is suitable for controlling the application of input voltage to a coil. The valve apparatus 100 shown in FIG. 1 may be utilized with any of the above described pressure sensing apparatus 150, 250, 350 or 450, or alternatively may be utilized with any suitable pressure sensing apparatus that provides an output indicative of a pressure, such as a 2006V2 pressure transducer/sensor manufactured by Dytran having an output of 50 mV/psi. The various pressure sensing apparatus 150, 250, 350 or 450 may be utilized with various valves configured to vary an opening area to vary output of the valve. Accordingly, various combinations of a pressure sensing apparatus, valve apparatus, and controller are provided. Referring to FIG. 11, a chart illustrates various possible combinations of pressure sensor apparatus and valve components according to the present disclosure. For example, the pressure sensor apparatus 150 having a translucent light attenuator 164 may be utilized with the valve apparatus 100' as shown in FIG. 6, with the valve apparatus 100 shown in FIG. 1, other modulating valve, etc. By way of further example, the valve apparatus 100 may be utilized with a conventional pressure sensing apparatus 700 as shown at 702, or the valve apparatus 100 may be utilized with the various pressure sensing apparatus 150, 250, 350 or 450.

According to aspects of the present application, an exemplary embodiment of a modulating gas valve includes or incorporates a co-axial valve assembly as the shut-off and modulating component controlled via an on-board microprocessor receiving information from an onboard pressure sensing assembly. The pressure sensing assembly is constructed of a diaphragm acting against a member constructed of a translucent material of varying thickness, with an optical emitter and collector on each side. The varying voltage output of the emitter/collector device as a function of the motion of the translucent member, in response to changes in pressure, is used to control the co-axial assembly to regulate the output of the valve.

According to aspects of the present application, an exemplary embodiment of an electronic pressure sensor for a gas valve application with integral safety indicator is disclosed. In this exemplary embodiment, a pressure sensor is internal to the valve and is used to detect a leakage situation when the valve should be closed. The sensor includes a transformer with an input coil, an output coil, and a movable core (e.g., a linear variable differential transformer), coupled, disposed on or attached to a diaphragm which moves as a function of gas pressure. The input and output coils are arranged in a parallel relationship, such that the first or output coil is disposed within the second or input coil. This internal pressure sensor could be used to sense, monitor, and/or detect an internal leak, e.g., pressure (flow) of gas when none is called for in an electrically operated fuel gas valve. By using the transformer, input and output coils, and a movable core, the position of the core can be measured within the input and output coil by measuring the voltage or current of the output coil. Increased engagement of the core increases the efficiency of the transformer. The core may be suspended between a diaphragm and a spring, as pressure is increased the diaphragm moves and pushes the core further into the coil increasing the transformer efficiency and increasing the output coil signal. A means to adjust the "zero pressure" position of the core may be incorporated into the adjustment to the spring pressure or an adjustable position of the coil over the core. Logic within the electronics may be configured to allow the pressure sensor to warn the end user audibly or visually of the presence of pressure when none is called for, as would occur in a leaking control situation. This assembly may thus be operable for outputting an analog response to pressure variation.

According to aspects of the present application, an exemplary embodiment of an add on pressure sensing module for a gas valve is disclosed. In this exemplary embodiment, the add on pressure sensing module includes a diaphragm switch to sense outlet pressure. Though the pressure sensing capability may be located in the valve body itself in some embodiments, this particular embodiment locates the pressure sensing module in a separate body attached to or separate from the gas valve body or inlet burner tube. The output from the sensor could be connected to a controller onboard the gas valve or connected to a furnace controller (e.g., integrated furnace control (IFC)) directly, such that the furnace controller could operate the modulating mechanism in the valve. In this latter case, the gas valve need not have an onboard controller because the algorithms for control may instead be vested in the furnace controller.

By way of example, the add on pressure sensing module may be screwed into an outlet pressure tap of a gas valve. In such example, a leak-limiting orifice feeds the underside of a small diaphragm. The small diaphragm may be adjustably spring loaded as a counter to the pressure, such that the diaphragm moves linearly against the spring force based on the gas pressure. Two independently adjustable light sensors may be provided that are triggered by the linear motion of the diaphragm. The output of these two sensors may be converted into a digital output with up to four distinct states, which can be used by a furnace control to create closed-loop feedback.

According to aspects of the present application, an exemplary embodiment of a closed-loop modulating coaxial gas valve is disclosed. In this exemplary embodiment, a modulating gas valve employs or includes a coaxial cascading valve assembly, which may be used to modulate the flow and pressure through the valve. The assembly may be used in combination with a fixed point electro-mechanical sensor to set a valve stage. The valve includes an internal pressure transducer and a redundant pressure sensor assembly comprising two switches tripped by a "flag" actuated by gas pressure acting on a diaphragm. In this example embodiment, a variable output sensor based on optical technology may be used as opposed to a switch type input. As an example, one embodiment may include low pressure electronic pressure sensing that provides more control options and thermal compensation. This also allows other functions for self-diagnostic capabilities. Accordingly, this exemplary embodiment may include closed-loop regulation as disclosed above, coaxial coil power modulation (e.g., Voltage, Amperage, or PWM control), and coaxial functions and features as disclosed in U.S. Pat. No. 6,047,718, the entire contents of which are incorporated herein by reference. The coaxial function may provide valve redundancy and an efficient flow path, which, in turn, may allow high capacity in a relatively small valve. The coaxial coil power modulation may provide accurate flow control and allow 1, 2, or 3 stage regulation as well as full modulation. The closed-loop regulation may make the valve independent of flow rate, orifice size, or downstream restrictions. Additional possible advantages that may be realized with this exemplary embodiment may include one or more (but not necessarily any or all) of high and low outlet pressure set point limits, self-diagnostic functions, limited leak detection, redundancy of pressure sensing, and pressure sensing accuracy verification.

According to aspects of the present application, exemplary embodiments are disclosed of a system and method in which optical sensors are used to give a desired output. During operation, the valve outlet might vary with temperature, and with valve variation in the location of the sensing method. A way to address and compensate for this is to communicate to the valve where the known points are and store this in a memory (e.g., permanent memory). In an exemplary embodiment, two known points from calibration may be used to control a single, two stage, or a modulating valve. For example, two optical sensors are located such that one optical sensor is above the single setting for a single stage and the other optical sensor is below the single setting for single stage. For a two stage application, one optical sensor is located above the upper setting for a two stage, and the other optical sensor is located below the lower setting for two stage. During testing when the valve is then built, the outlet pressure reading can be stored in permanent memory for the two optical sensors. Then, the control can interpolate between these two known points to get to the one, two, or many points, depending on the model. Depending on the particular application, current or voltage may be measured and used for the interpolation. In addition, this exemplary embodiment may also include sensing the temperature to add or subtract its average effect on the outlet pressure. Redundancy may be added in the form of additional sensors.

According to aspects of the present application, exemplary embodiments are disclosed of a system and method in which optics are used for sensing position between two known points and/or as an input to a PID (proportional integral derivative) control loop for valve control. An exemplary embodiment includes a sensor configured (e.g., a sensor with a gradual region, a hall sensor) such that there is a varying level or amount of light from sender to receiver. By way of example, an optic sensor having a variable output between two endpoints or a hall sensor may be used. Variability may be provided or produced by a medium located between the emitter and collector photodiodes, such as by a material of variable thickness, screening of ink, doping of material, a slot of varying width, etc. The variable output is indicative of the output pressure of the valve. The amount of light sent by the sender can be varied (e.g., by pulse-width modulation (PWM)) to control the range of sensing and keep it in the desired area. The control can pick the low or high end and adjust the light on the sending end such that the receiver just starts to conduct or is almost in full conduction when the position is at that end, whichever is appropriate. This adjustment of the light output on the sender may, for example, help an LED over time and temperature. A hall approach may also be used for sensing over a range close to one of the two optical digital sensors. In this example, the sensor may be used for internal feedback in controlling a fuel gas valve and/or for setting two endpoints and interpolating between them to determine the operating range of the system. This exemplary embodiment may be used to provide analog signals for PID control for single and two-stage controls as well as modulating controls.

Thus, it will be understood by those skilled in the art that the above described embodiments and combinations thereof may be employed in various types of systems with any combination of the above disclosed features, without implementing the others. It will be understood that the gas valves and controllers described above may be utilized in other forms of heating and cooling equipment, including water heater and boiler appliances. Accordingly, it should be understood that the disclosed embodiments, and variations thereof, may be employed without departing from the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Numerical dimensions and values are provided herein for illustrative purposes only. The particular numerical dimensions and values provided are not intended to limit the scope of the present disclosure as they may be varied depending on the particular application and/or end use.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A valve apparatus comprising:
  a first valve seat;
  a second valve seat substantially co-aligned with the first valve seat;
  a first valve member moveable relative to the first valve seat between at least an open position in which the first valve member is spaced from the first valve seat and a closed position in which the first valve member is seated against the first valve seat;

a second valve member substantially co-aligned with the first valve member, the second valve member moveable relative to the second valve seat between at least an open position in which the second valve member is spaced from the second valve seat and a closed position in which the second valve member is seated against the second valve seat;

a coil;

an armature operable for moving the first valve member and second valve member in response to a magnetic field generated by the coil; and a pressure sensor configured to provide an output voltage indicative of pressure at an outlet of the valve apparatus;

the armature configured to move at least the second valve member relative to the second valve seat to vary an extent of an opening area therebetween to achieve multiple, different desired outlet pressures while the opening area is at least partially open.

2. The valve apparatus of claim 1, wherein:

the first valve member is coaxial with the second valve member;

the first valve seat is coaxial with the second valve seat; and the armature is configured to move the first and second valve members relative to at least the second valve seat to vary an opening area between the first valve member and the first valve seat and to vary the opening area between the second valve member and the second valve seat;

wherein the multiple, different desired outlet pressures include at least three different desired outlet pressures.

3. The valve apparatus of claim 1, wherein the pressure sensor includes:

a diaphragm moveable in response to changes in pressure acting against the diaphragm;

a light emitter;

a light sensing device; and a light attenuator coupled to the diaphragm such that the light attenuator is moveable by the diaphragm between the light emitter and the light sensing device in response to changes in pressure acting against the diaphragm, the light attenuator configured to attenuate or vary the amount of light transmitted to the light sensing device from the light emitter as the light attenuator is moved therebetween by the diaphragm in response to changes in pressure;

whereby the light sensing device is operable to responsively provide a voltage output commensurate with the amount of light sensed by the light sensing device, which voltage output is indicative of a sensed pressure acting against the diaphragm.

4. The valve apparatus of claim 3, wherein:

the light attenuator has a variable thickness configured to reduce the amount of incident light transmitted through the light attenuator as a function of thickness of the light attenuator; and/or the light attenuator is comprised of a material that possesses sufficient light permeability to allow some incident light to be transmitted through the light attenuator, and sufficient opacity to impede light transmission so as to reduce the amount of light transmitted through the light attenuator as a function of the thickness of the light attenuator; and/or the diaphragm has first and second sides, the first side being in fluid communication with a pressurized volume in the valve apparatus such that the diaphragm is moveable in response to changes in fluid pressure acting against the first side of the diaphragm; and/or the light attenuator is disposed on a pin biased by a spring against the diaphragm such that changes in pressure acting against the diaphragm cause the diaphragm to move the light attenuator up and down; and/or the light emitter and the light sensing device are aligned with and spaced apart from one another, such that the light emitter is directed at the light sensing device; and/or a width of the light attenuator gradually tapers over its length to provide a sufficient thickness gradient to enable detection of incremental changes in the amount of attenuation by the light attenuator over its length; and/or the light sensing device of the pressure sensor is configured to provide a voltage output that changes from a substantially maximum voltage output to a fractional voltage output upon detecting that the light attenuator has moved from a position in which the light attenuator is not between the light emitter and the light sensing device to a position in which a portion of the light attenuator is between the light emitter and the light sensing device, and wherein the light sensing device is configured to subsequently provide a voltage output that enables calibration of the present voltage output of the light sensing device with the actual known position of the light attenuator relative to the light sensing device.

5. The valve apparatus of claim 3, wherein:

a controller is coupled to the pressure sensor and the coil, wherein the controller is configured to determine a sensed pressure from the voltage output voltage of the light sensing device, and to adjust the application of input voltage to the coil based on the sensed pressure, to thereby operate the armature to adjust the opening area between at least the second valve member and second valve seat to achieve the multiple, different desired outlet pressures; and/or the varying voltage output of the pressure sensor as a function of the motion of the light attenuator, in response to changes in pressure acting against the diaphragm, is used to control the valve apparatus to regulate the output of the valve apparatus.

6. The valve apparatus of claim 1, wherein the pressure sensor includes:

a diaphragm moveable in response to changes in pressure acting against the diaphragm;

a first light emitter;

a second light emitter;

a first light sensing device;

a second light sensing device; and a light interrupter coupled to the diaphragm such that the light interrupter is moveable by the diaphragm between the first light emitter and the first light sensing device when the diaphragm is exposed to a first pressure acting against the diaphragm and such that the light interrupter is moveable by the diaphragm between the second light emitter and the second light sensing device when the diaphragm is exposed to a second pressure acting against the diaphragm;

whereby a desired pressure of the valve apparatus can be established by interpolating between first and second positions of the first and second valve members at which the light interrupter is detected by the first and second light sensing devices corresponding to the first and second pressures.

7. The valve apparatus of claim 6, further comprising a controller coupled to the pressure sensor and the coil, wherein the controller is configured to adjust the application of input voltage to the coil by interpolating between first and second input voltages applied to the coil to establish the first and second positions of the first and second valve members at which the light interrupter is detected by the first and second light sensing devices corresponding to the first and second pressures.

8. The valve apparatus of claim 6, wherein:
the first light emitter and the first light sensing device are positioned on opposite sides of the light interrupter, and the second light emitter and the second light sensing device are positioned on opposite sides of the light interrupter higher than the first light emitter and first light sensing device, such that the second light emitter and second light sensing device are operable to detect the light interrupter between the second light emitter and the second light sensing device when the diaphragm is exposed to the second pressure, which is higher than the first pressure; and/or
the diaphragm has first and second sides, the first side being in fluid communication with a pressurized volume in a valve apparatus such that the diaphragm is moveable in response to changes in fluid pressure acting against the first side of the diaphragm; and/or
the light interrupter is configured to substantially impede transmission of light therethrough, and is disposed on a pin that is biased by a spring against the diaphragm such that an increase or decrease in pressure acting against the diaphragm causes the diaphragm to raise or lower the pin and light interrupter, respectively; and/or
the multiple, different desired pressures include a pressure level that is above the first pressure and below the second pressure; and/or
the first pressure is below a rated outlet pressure for the valve apparatus and the second pressure is above the rated outlet pressure; and/or
the first light emitter and first light sensing device are preferably aligned with and spaced apart from one another, such that the first light emitter is directed at the first light sensing device; and/or
the second light emitter and the second light sensing device are located above the first light emitter and the first light sensing device.

9. The valve apparatus of claim 1, wherein the pressure sensor includes:
a diaphragm moveable in response to changes in pressure acting against the diaphragm;
a first switch;
a second switch; and
a trigger coupled to the diaphragm such that the trigger is moveable by the diaphragm to actuate the first switch when the diaphragm is exposed to a first pressure acting against the diaphragm, and such that the trigger is moveable by the diaphragm to actuate the second switch when the diaphragm is exposed to a second pressure acting against the diaphragm;
whereby the first switch and the second switch are operable to responsively provide an output that is indicative of the first pressure and second pressure, respectively.

10. The valve apparatus of claim 9, further comprising a controller coupled to the pressure sensor and the coil, the controller configured to control power applied to the coil based upon the trigger actuation of the first and second switches that correspond to the respective first and second pressures.

11. The valve apparatus of claim 9, wherein:
the second switch is positioned above the first switch such that the second switch is operable to detect the trigger when the diaphragm is exposed to the second pressure, which is higher than the first pressure; and/or
the first switch and the second switch are aligned with and spaced apart from one another, such that the trigger is raised and lowered between the first switch and second switch; and/or
the diaphragm has first and second sides, the first side being in communication with an outlet of the valve apparatus such that the diaphragm is moveable in response to changes in outlet pressure acting against the first side; and/or
the trigger extends in a generally perpendicular direction from a pin that is disposed on the diaphragm, such that an increase or decrease in pressure acting against the diaphragm causes the diaphragm to raise or lower the trigger, respectively.

12. The valve apparatus of claim 1, wherein the pressure sensor includes:
a diaphragm moveable in response to changes in pressure acting against the diaphragm; and
a transformer including a moveable core, the moveable core coupled to the diaphragm such that the moveable core is movable by the diaphragm to vary output of the transformer with changes in pressure acting against the diaphragm, whereby the transformer is operable for providing an output that varies with core movement, which is commensurate with changes in outlet pressure.

13. The valve apparatus of claim 12, further comprising a controller coupled to the pressure sensor and the coil, the controller configured to adjust the application of input voltage to the coil based on the output of the transformer, to thereby operate the armature to adjust the opening area between at least the second valve member and second valve seat to achieve a desired outlet pressure.

14. The valve apparatus of claim 1, wherein the pressure sensor is in communication with a pressurized volume in the valve apparatus, the pressure sensor being configured to provide an output voltage that is indicative of a sensed pressure in the valve apparatus; further comprising:
a controller coupled to the pressure sensor and the coil, wherein the controller is configured to determine a sensed pressure from the output voltage of the pressure sensor, and to adjust the application of input voltage to the coil based on the sensed pressure, to thereby operate the armature to adjust the opening area between at least the second valve member and second valve seat to achieve the multiple, different desired outlet pressures.

15. The valve apparatus of claim 1, wherein the pressure sensor is configured to respond to pressure changes by varying an amount of light transmitted to a light sensing device, which provides a voltage output commensurate with the amount of transmitted light to the light sensing device that is indicative of sensed pressure.

16. The valve apparatus of claim 1, wherein:
the coil comprises a solenoid coil configured such that the armature is operable for moving at least the second valve member relative to the second valve seat to vary the opening area therebetween based on a magnitude of the generated magnetic field that is dependent on an input voltage applied to the solenoid coil; and
the input voltage applied to the solenoid coil is based in part on the output voltage provided by the pressure sensor that is indicative of pressure at the outlet.

17. The valve apparatus of claim 16, further comprising a controller coupled to the pressure sensor and the solenoid coil, wherein the controller is configured to determine a sensed pressure from the output voltage provided by the pressure sensor, and to control application of input voltage to the solenoid coil based on the sensed pressure, to thereby operate the armature to adjust the opening area between the second valve member and second valve seat to achieve the multiple, different desired outlet pressures.

18. The valve apparatus of claim 1, wherein:
the coil is part of a stepper-motor that displaces the armature based on an applied voltage; and
the armature is configured to move a first distance to move the first valve member between the closed and open positions of the first valve member, and configured to move beyond the first distance to move the second valve member between the closed and open positions of the second valve member; and
the pressure sensor configured to provide an output voltage indicative of pressure at an outlet of the valve apparatus, the pressure sensor disposed outside of a body of the valve apparatus.

19. The valve apparatus of claim 1, wherein:
the pressure sensor comprises a diaphragm operable for providing a control signal for controlling operation of the coil to modulate fuel flow through the valve apparatus without requiring a direct mechanical linkage between a regulator diaphragm and the first and second valve members; and/or
the valve apparatus does not include a regulator diaphragm with a direct mechanical linkage to the first or second valve members for mechanically imparting movement to the first and second valve members.

20. The valve apparatus of claim 1, wherein the valve apparatus is configured as a closed-loop modulating coaxial valve in which the first and second valve members define a coaxial cascading valve assembly for modulating flow and pressure through the valve apparatus.

* * * * *